United States Patent
Morozs et al.

(10) Patent No.: US 12,063,566 B2
(45) Date of Patent: Aug. 13, 2024

(54) COMMUNICATION NETWORK AND METHOD OF MAINTAINING CONNECTION

(71) Applicant: STRATOSPHERIC PLATFORMS LIMITED, Douglas (IM)

(72) Inventors: Nils Morozs, York (GB); David Grace, York (GB)

(73) Assignee: Stratospheric Platforms Ltd, Douglas (IM)

( * ) Notice: Subject to any disclaimer, the term of this patent is extended or adjusted under 35 U.S.C. 154(b) by 489 days.

(21) Appl. No.: 17/309,224

(22) PCT Filed: Nov. 8, 2019

(86) PCT No.: PCT/GB2019/053163
§ 371 (c)(1),
(2) Date: May 7, 2021

(87) PCT Pub. No.: WO2020/095057
PCT Pub. Date: May 14, 2020

(65) Prior Publication Data
US 2021/0392559 A1    Dec. 16, 2021

(30) Foreign Application Priority Data
Nov. 9, 2018 (GB) .................................... 1818292

(51) Int. Cl.
*H04W 36/32* (2009.01)
*H04W 16/28* (2009.01)
(Continued)

(52) U.S. Cl.
CPC ........... *H04W 36/32* (2013.01); *H04W 16/28* (2013.01); *H04W 36/08* (2013.01); *H04W 84/06* (2013.01)

(58) Field of Classification Search
CPC ...... H04W 36/08; H04W 16/28; H04W 36/32
See application file for complete search history.

(56) References Cited

U.S. PATENT DOCUMENTS 6,021,309 A     2/2000   Sherman et al.
6,317,583 B1   11/2001   Wolcott
(Continued)

FOREIGN PATENT DOCUMENTS

CA   3003667 A1   5/2017
CN   1172566 A    2/1998
(Continued)

OTHER PUBLICATIONS

"International Application No. PCT/GB2019/053163, International Search Report and Written Opinion mailed Jan. 24, 2020", (Jan. 24, 2020), 11 pgs.

(Continued)

*Primary Examiner* — Kevin M Cunningham
(74) *Attorney, Agent, or Firm* — Schwegman Lundberg & Woessner, P.A.

(57) ABSTRACT

A method for maintaining a connection of mobile user equipment to a core network, and a communication network are disclosed. The method comprises the steps of providing a multi-channel communication link between a user equipment at a first location and a plurality of aerial vehicles, determining that the user equipment is moving whereby a loss of connectivity via the multi-channel communication link may occur, and subsequently, via a handover step, transferring communication between the user equipment and a core network from communication via the multi-channel communication link to communication via a single channel communication link provided by a respective aerial vehicle.

18 Claims, 18 Drawing Sheets

(51) Int. Cl.
*H04W 36/08* (2009.01)
*H04W 84/06* (2009.01)

(56) References Cited

U.S. PATENT DOCUMENTS

| | | | |
|---|---|---|---|
| 9,621,254 | B2 | 4/2017 | Chang |
| 9,853,715 | B2 | 12/2017 | Jalali |
| 10,348,394 | B1 | 7/2019 | Bakr et al. |
| 11,637,624 | B2 | 4/2023 | Morozs et al. |
| 2006/0286974 | A1 | 12/2006 | Gore et al. |
| 2007/0202802 | A1 | 8/2007 | Kallio et al. |
| 2013/0070677 | A1 | 3/2013 | Chang |
| 2014/0219124 | A1 | 8/2014 | Chang et al. |
| 2014/0241239 | A1 | 8/2014 | Chang |
| 2015/0304019 | A1 | 10/2015 | Shreve et al. |
| 2016/0156409 | A1 | 6/2016 | Chang |
| 2017/0013632 | A1 | 1/2017 | Bercovich et al. |
| 2017/0085307 | A1 | 3/2017 | Yazdani et al. |
| 2017/0150342 | A1 | 5/2017 | Slater et al. |
| 2017/0187440 | A1 | 6/2017 | Chang |
| 2017/0235316 | A1 | 8/2017 | Shattil |
| 2017/0339575 | A1 | 11/2017 | Kim et al. |
| 2018/0069610 | A1 | 3/2018 | Alexander et al. |
| 2018/0083678 | A1 | 3/2018 | Alexander et al. |
| 2018/0102832 | A1 | 4/2018 | Chang |
| 2018/0115065 | A1 | 4/2018 | Valdes Garcia et al. |
| 2018/0166779 | A1 | 6/2018 | Feria et al. |
| 2018/0241460 | A1 | 8/2018 | Hong et al. |
| 2020/0178137 | A1* | 6/2020 | Hassan Hussein .................. H04W 36/00835 |
| 2021/0391917 | A1 | 12/2021 | Morozs et al. |
| 2021/0399790 | A1 | 12/2021 | Morozs et al. |
| 2023/0095995 | A1* | 3/2023 | Rakib .................. B64U 10/30 244/31 |

FOREIGN PATENT DOCUMENTS

| | | |
|---|---|---|
| CN | 1675855 A | 9/2005 |
| CN | 102724684 A | 10/2012 |
| CN | 104579412 A | 4/2015 |
| CN | 105375957 A | 3/2016 |
| CN | 107210789 A | 9/2017 |
| CN | 107431528 A | 12/2017 |
| CN | 107800469 A | 3/2018 |
| CN | 107925937 A | 4/2018 |
| CN | 108292949 A | 7/2018 |
| CN | 108349589 A | 7/2018 |
| CN | 108476057 A | 8/2018 |
| CN | 107959983 B | 1/2022 |
| EP | 0845877 A2 | 6/1998 |
| EP | 3675547 A1 | 7/2020 |
| GB | 2536015 A | 9/2016 |
| RU | 2371850 C1 | 10/2009 |
| RU | 2428817 C2 | 9/2011 |
| WO | WO-2012109480 A1 | 8/2012 |
| WO | WO-2015161040 A1 | 10/2015 |
| WO | WO-2017019595 A1 | 2/2017 |
| WO | WO-2020095056 A1 | 5/2020 |
| WO | WO-2020095057 A1 | 5/2020 |
| WO | WO-2020095060 A1 | 5/2020 |

OTHER PUBLICATIONS

Grace, David, et al., "Improving the System Capacity of Broadband Services Using Multiple High-Altitude Platforms", IEEE Transactions on Wireless Communications, vol. 4, No. 2, Mar. 2005, (Mar. 2005), 700-709.
"U.S. Appl. No. 17/309,223, Notice of Allowance mailed Dec. 27, 2022", 9 pgs.
"U.S. Appl. No. 17/309,225, Non Final Office Action mailed Mar. 30, 2023", 10 pgs.
"Chinese Application No. 201980088530.7, Second Office Action mailed Feb. 15, 2023", (Feb. 15, 2023), 9 pgs.
"U.S. Appl. No. 17/309,223 Preliminary Amendment Filed with Application", 10 pgs.
"U.S. Appl. No. 17/309,223, Non Final Office Action mailed Apr. 14, 2022", 14 pgs.
"U.S. Appl. No. 17/309,223, Notice of Allowance mailed Sep. 7, 2022", 10 pgs.
"U.S. Appl. No. 17/309,223, Response filed Aug. 15, 2022 to Non Final Office Action mailed Apr. 14, 2022", 9 pgs.
"U.S. Appl. No. 17/309,225 Preliminary Amendment Filed with Application", 9 pgs.
"Chinese Application No. 201980088530.7, First Office Action mailed Aug. 25, 2022", (Aug. 25, 2022), 23 pgs.
"Chinese Application No. 201980088547.2, First Office Action dated Jul. 6, 2022", (Jul. 6, 2022), 20 pgs.
"Chinese Application No. 201980088552.3, First Office Action mailed Jun. 6, 2022", (Jun. 6, 2022), 18 pgs.
"Electronic Communications Committee (ECC)", ECC Recommendation (08)02. Frequency planning and frequency coordination for GSM / UMTS / LTE / WiMAX Land Mobile systems operating within the 900 and 1800 MHZ bands, (Apr. 27, 2012), 17 pgs.
"Electronic Communications Committee (ECC)", ECC Recommendation (15)01. Crossborder coordination for mobile / fixed communications networks (MFCN) in the frequency bands: 694-790 MHZ, 1452-1492 MHZ, 3400-3600 MHz and 3600-3800 MHZ, (Feb. 5, 2016), 15 pgs.
"Electronic Communications Committee (ECC)", ERC Recommendation 01-01. Crossborder coordination for mobile/fixed communications networks (MFCN) in the frequency bands: 1920-1980 MHz and 2110-2170 MHZ, (Feb. 5, 2016), 16 pgs.
"International Application No. PCT/GB2019/053162, International Preliminary Report on Patentability mailed May 20, 2021", 11 pgs.
"International Application No. PCT/GB2019/053162, International Search Report and Written Opinion mailed Jan. 30, 2020", (Jan. 30, 2020), 13 pgs.
"International Application Serial No. PCT/GB2019/053167, International Preliminary on Patentability mailed May 11, 2021", 9 pgs.
"International Application Serial No. PCT/GB2019/053167, International Search Report mailed Jan. 27, 2020", 4 pgs.
"International Application Serial No. PCT/GB2019/053167, Written Opinion mailed Jan. 27, 2020", 8 pgs.
3GPP, "TR 36.942 v13.0.0 (Jan. 2016)", 3rd Generation Partnership Project; Technical Specification Group Radio Access Network; Evolved Universal Terrestrial Radio Access (E-UTRA); Radio Frequency (RF) system scenarios (Release 13), (Jan. 7, 2016), 109 pgs.
3GPP, "TS 36.213 v14.0.0 (Sep. 2016)", 3rd Generation Partnership Project; Technical Specification Group Radio Access Network; Evolved Universal Terrestrial Radio Access (E-UTRA); Physical layer procedures (Release 14), (Sep. 29, 2016), 405 pgs.
ETSI, "Technical Specification 136.305 v9.2.0 (Apr. 2010)", Evolved Universal TerrestrialC/Radio Access Network (E-UTRAN); Stage 2 functional specification of User Equipment (UE) positioning in E-UTRAN (Release 9), Mar. 2010, (Mar. 2010), 54 pgs.
Larsson, Erik G., et al., "Massive MIMO for next generation wireless systems", IEEE Communications Magazine, vol. 52(2), (Feb. 2014), 186-195.
Muralidharan, Arjun, et al., "Distributed Beamforming Using Mobile Robots", 2016 IEEE International Conference on Acoustics, Speech and Signal Processing (ICASSP), (Mar. 20, 2016), 6385-6389.
Spencer, Quentin H., et al., "Zero-Forcing Methods for Downlink Spatial Multiplexing in Multiuser MIMO Channels", IEEE Transactions on Signal Processing, vol. 52, No. 2, Feb. 2004, (Feb. 2, 2004), 461-471.
Tozer, Tim C., et al., "High-altitude platforms for wireless communications", Electronics & Communication Engineering Journal, vol. 13, No. 3, pp. 127-137, 2001, (Jun. 2001), 127-137.
Zakia, Irma, "Coordinated beamforming for high-speed trains in multiple HAP networks", 2017 11th International Conference on Telecommunications Systems Services and Applications (TSSA) [abstract only], (Oct. 26, 2017), 1-4.
3GPP, "LTE; Evolved Universal Terrestrial Radio Access (E-UTRA)", Radio Frequency (RF) system scenarios (3GPP TR 36.942 version 13.0.0 Release 13), (Jan. 7, 2016), 109 pgs.

(56) References Cited

OTHER PUBLICATIONS

3GPP, "LTE; Evolved Universal Terrestrial Radio Access (E-UTRA)", Physical layer procedures (3GPP TS 36.213 version 14.0.0 Release 14), (Sep. 29, 2016), 405 pgs.

ECC, "Electronic Communications Committee (ECC), "ECC Recommendation (15)01. Crossborder coordination for mobile / fixed communications networks (MFCN) in the frequency bands: 694-790 MHz, 1452-1492 MHZ, 3400-3600 MHz and 3600-3800 MHZ"", (Feb. 5, 2016), 15 pgs.

ECC, "Electronic Communications Committee (ECC), "ERC Recommendation 01-01. Crossborder coordination for mobile/fixed communications networks (MFCN) in the frequency bands: 1920-1980 MHz and 2110-2170 MHz"", (Feb. 5, 2016), 16 pgs.

ECC, "Electronics Communication Committee (ECC), "ECC Recommendation (08)02. Frequency planning and frequency coordination for GSM / UMTS / LTE / WiMAX Land Mobile systems operating within the 900 and 1800 MHZ bands"", (Apr. 27, 2012), 17 pgs.

Larsson, Erik G., et al., "Massive MIMO for next generation wireless systems", IEEE Communications Magazine, vol. 52(2), (Jan. 23, 2014), 20 pgs.

"International Application No. PCT/GB2019/053163, International Preliminary Report on Patentability mailed May 20, 2021", 9 pgs.

"Channel state information", Wikipedia; www.wikipedia.org/wiki/channel_state_information (Wikipedia (Archive.org)), (Dec. 2016), 3 pgs.

"Communication—Channel Estimation", www.sharetechnote.com/html/Communication_channelEstimation (Archive.org), 13 pgs.

Wiesel, Ami, et al., "Zero-Forcing Precoding and Generalized Inverses", IEEE Transactions on Signal Processing, vol. 56, No. 9, Sep. 2008, (Aug. 13, 2008), 4409-4417.

3GPP, "Technical Specification 36.305 v9.2.0", Evolved Universal Terrestrial Radio Access Network (E-UTRAN); Stage 2 functional specification of User Equipment (UE) positioning in E-UTRAN (Release 9), Mar. 2010, (Mar. 2020), 52 pgs.

Muralidharan, Arjun, et al., "Distributed beamforming using mobile robots", 2016 IEEE International conference on acoustics, speech and signal processing, IEEE, Mar. 20, 2016, (Mar. 20, 2016), 6 pgs.

Spencer, Quentin H., et al., "Zero-Forcing Methods for Downlink Spatial Multiplexing in Multiuser MIMO Channels", IEEE transactions on signal processing, vol. 52 No. 2 pp. 461-471, 2004, Feb. 2, 2004, (Feb. 2, 2004), 461-471.

Tozer, T.C., et al., "High-altitude platforms for wireless communications", Electronics & Communication Engineering Journal, vol. 13, No. 3, pp. 127-137, 2001, (Jul. 2001), 127-137.

Zakia, Irma, "Coordinated beamforming for high-speed trains in multiple HAP networks", 2017 11th International conference on telecommunication system services and applications, IEEE, Oct. 26, 2017, (Oct. 26, 2017), 4 pgs.

"U.S. Appl. No. 17/309,225, Non Final Office Action mailed Sep. 26, 2023", 9 pgs.

"U.S. Appl. No. 17/309,225, Response filed Feb. 26, 2024 to Non Final Office Action mailed Sep. 26, 2023", 9 pgs.

"U.S. Appl. No. 17/309,225, Response filed Jul. 13, 2023 to Non Final Office Action mailed Mar. 30, 2023", 7 pgs.

"Chinese Application No. 201980088530.7, Chinese Search Report dated Aug. 17, 2022", (Aug. 17, 2022), 1 pg.

"Chinese Application No. 201980088530.7, First Office Action mailed Aug. 25, 2022", (Aug. 25, 2022), 12 pgs.

* cited by examiner

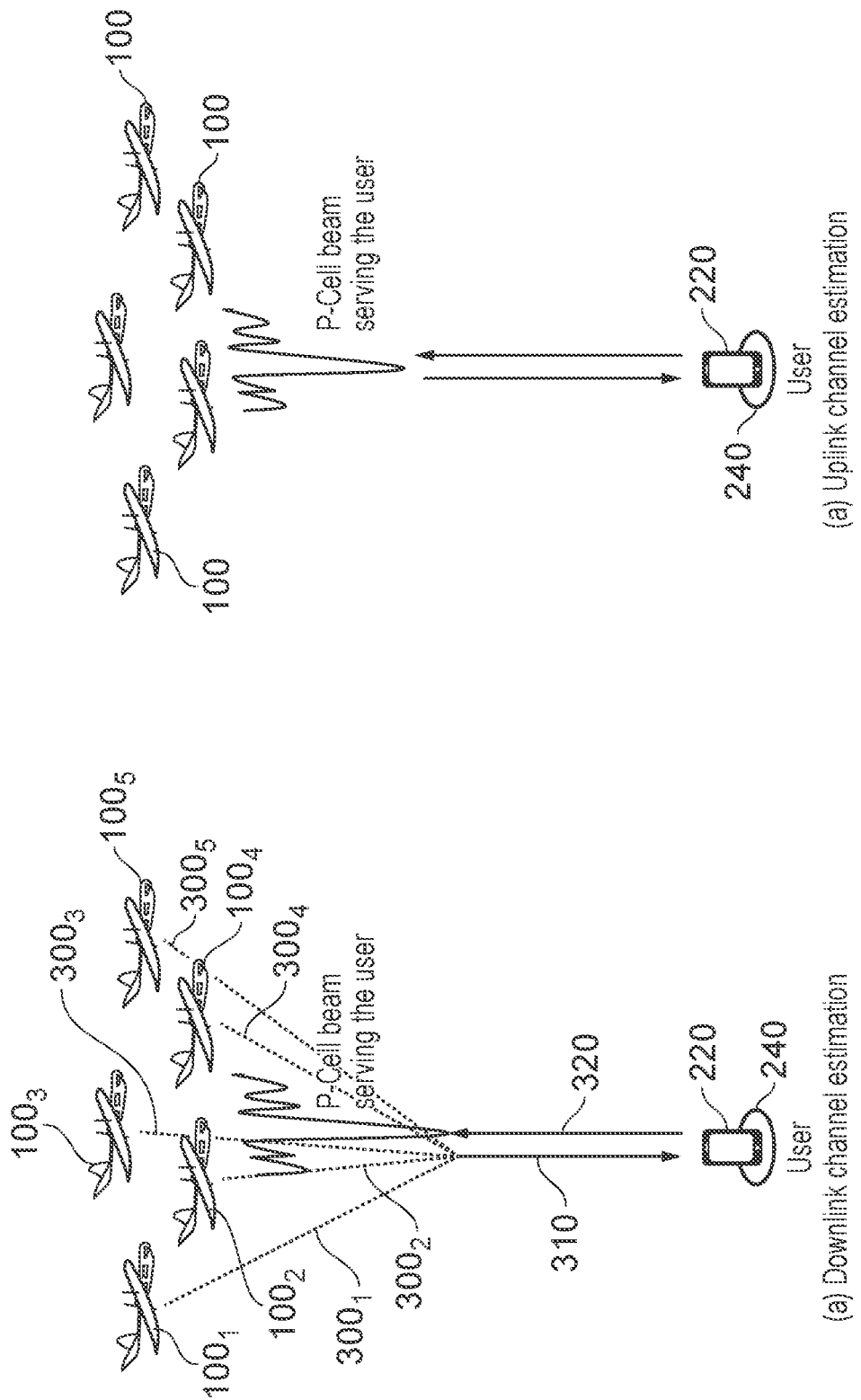

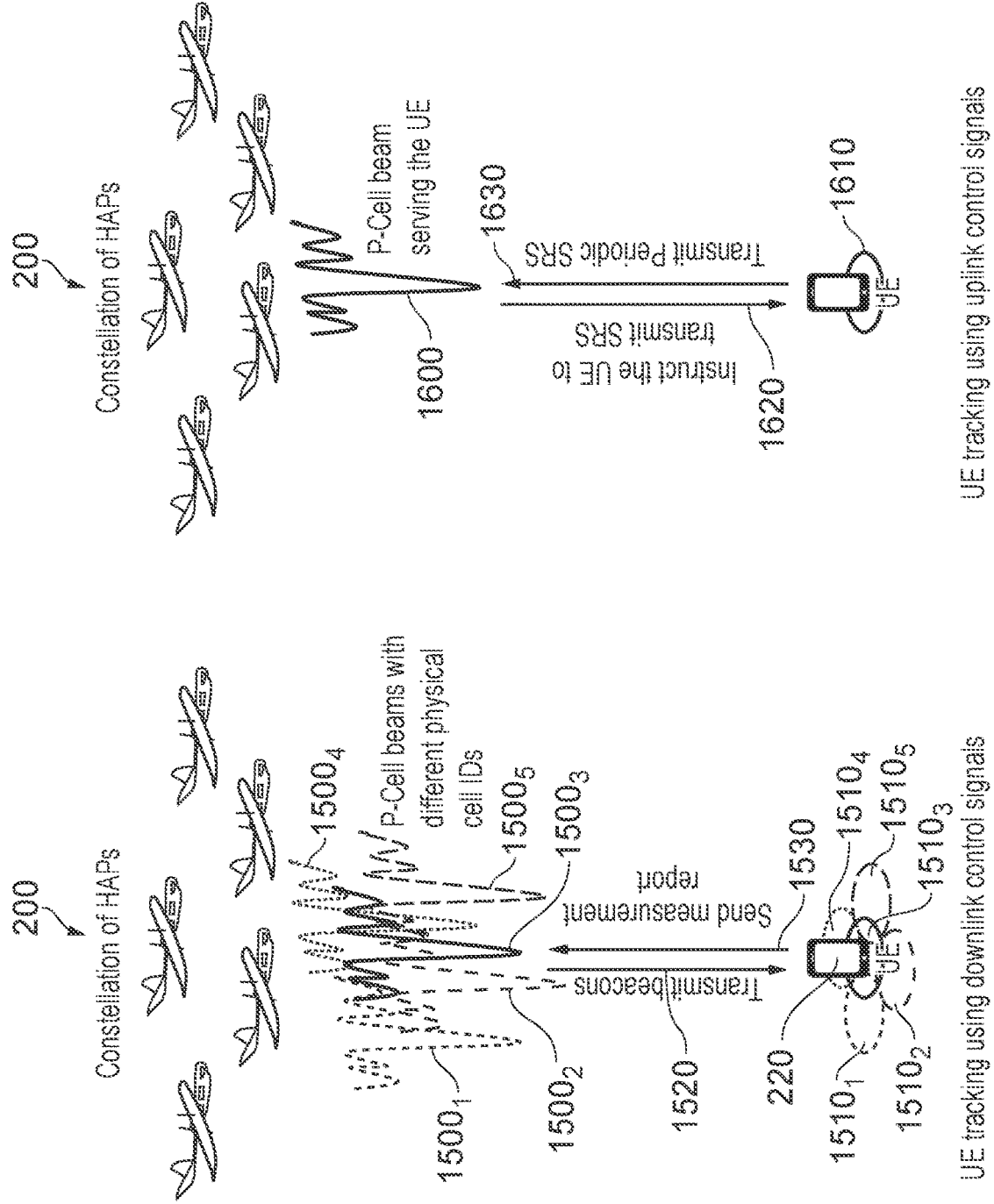

COMMUNICATION NETWORK AND METHOD OF MAINTAINING CONNECTION

PRIORITY CLAIM TO RELATED APPLICATIONS

This application is a U.S. national stage filing under 35 U.S.C. § 371 from International Application No. PCT/GB2019/053163, filed on 8 Nov. 2019, and published as WO2020/095057 on 14 May 2020, which claims the benefit under 35 U.S.C. 119 to United Kingdom Application No. 1818292.3, filed on 9 Nov. 2018, the benefit of priority of each of which is claimed herein, and which applications and publication are hereby incorporated herein by reference in their entirety.

The present invention relates to a communication network and to a method of wireless communication between user equipment and aerial vehicles. In particular, but not exclusively, the present invention relates to the provision of high speed broadband services from high altitude platforms (HAPs) in which a connection between mobile user equipment and a core network is maintained by, when a loss of connectivity may occur, via a handover step, transferring communication between user equipment and a core network from communication via a multi-channel communication link that provides a relatively narrow cell coverage area to communication via a single channel communication link that provides a relatively wide cell coverage area.

The provision of wireless communication using aerial vehicles has been suggested for many years. Various types of aerial vehicles such as tethered balloons or manned aircraft or unmanned aircraft have been suggested. High-altitude platforms (HAPs) have been suggested as a type of aerial vehicle. In particular the provision of high speed broadband services from HAPs has now been discussed in the prior art for a number of years. Various authors have discussed how HAPs deployed in the stratosphere around 15 to 22 km in altitude, can achieve an excellent trade off between terrestrial cellular networks and satellite based systems. HAPs have the advantage that they are capable of covering significantly wider areas with Line-of-Sight (LoS) communication links compared with terrestrial systems yet do not suffer from capacity and propagation delay limitations typically provided by satellite based systems. For example, geostationary satellites are located approximately 1800× further from the earth's surface than HAPs.

Wireless networks are required to deliver high aggregate data rates within a limited bandwidth through efficient spectral use. A way this can be achieved is to use directional antennas on each HAP. For example, it has been suggested that user equipment such as mobile phones, tablets or laptops or other such user devices can communicate wirelessly with a number of HAPs equipped with directional antennas such as horn or multi-element phased array antennas. These antennas can be utilised to form beams towards the ground thus illuminating "cells" that can be perceived by the user equipment as conventional terrestrial cells. An advantage of this approach relative to non-aerial vehicle based communication networks is that the locations and density of cells created by the HAPs are dynamically controllable and do not involve changes to the infrastructure on the ground.

A limitation on the spatial reuse of the wireless spectrum, and thus on the capacity, of HAP based wireless networks is that the directionality of the antennas mounted on HAPs are limited by their aperture size. The physical size and weight of an antenna mounted on a HAP is severely limited by the payload requirements of any HAP in question.

The idea of overcoming the limitations imposed by use of a single HAP antenna beam width by using multiple HAPs illuminating the same area, and as a result boosting the broadband capacity in the area, has been proposed by Grace et al "*Improving the system capacity of broadband services using multiple high-altitude platforms*" *IEEE Transactions on Wireless Communications*, vol. 4, no. 3, pp. 700-709, March 2005. In that proposed solution the directionality of user antenna is a key component. The user nodes are assumed to be static with highly directional antennas e.g. dishes such that they are able to distinguish between different HAPs in the sky. However, this approach does not achieve any capacity gains in a scenario where the user devices are not directional enough to be able to point narrow beams to separate HAPs in the stratosphere above them. For example, this approach is not usable when HAPs are required to provide connectivity to conventional cellular network user equipment i.e. mobile phones with negligible directionality of their antennas.

GB2536015 suggests a manner for overcoming the spatial spectrum reuse limitation imposed by the size of antenna mounted on a HAP. GB2536015 discusses the use of a so-called constellation of multiple HAPs to perform co-operative beamforming. In GB2536015 multiple HAPs spaced several kilometres apart adjust the phase of the signal to/from a particular user equipment such that all copies of a signal arrive at a receiver in phase. This yields a power gain due to the coherent addition of multiple signals to/from every HAP. This works effectively as a large, highly sparse phased array antenna. As a result, the perceived "effective antenna" formed by several HAPs span several kilometres. This allows the constellation of HAPs to create narrow cells at desired locations. However, in order to be able to create such narrow cells a location of any user equipment where a beam is to be focused must first be accurately determined to a very high degree of accuracy. This in itself is a complex problem which is made all the greater when the user equipment is mobile.

Conventionally a challenging aspect of forming such narrow inter-HAP cooperative beams has been the determination of the location of user equipment accurately enough. I.e. to within 50 cm or preferably within 10 cm. Such beams which are formed cooperatively are an example of a multi-channel wireless communication link and can be considered as providing a personal cell (P-cell). To be able to use such a small cell an approach is needed to associate a user with the P-cell and given that the cell is so small the cell must be able to track the location of the user so as to avoid excessively frequent handovers between P-cells. If a user of user equipment is mobile both user acquisition and tracking is difficult to achieve. A prior art approach of gradually narrowing down an existing beam by starting with few HAPs located close to one another and then adding more and more HAPs into a cooperative beamforming process (thus increasing the effective size of a sparse phased array of HAP antennas) has been suggested. However such methodologies suffer from various disadvantages such as the time taken to gradually narrow down an existing beam.

It is an aim of the present invention to at least partly mitigate one or more of the above-mentioned problems.

It is an aim of certain embodiments of the present invention to provide a communication network and method of communicating whereby propagation characteristics for each respective wireless communication channel between a user equipment and aerial vehicles can be determined and thereafter used in a co-operative technique to connect user equipment to a core network via a multi-channel communication link.

It is an aim of certain embodiments of the present invention to provide a process for estimating a wireless channel attenuation and phase shift between multiple user equipment and multiple aerial vehicle antennas and using this channel information to provide mobile coverage to the user equipment.

It is an aim of certain embodiments of the present invention to provide mobile coverage to multiple user equipment in the same frequency-time spectrum.

It is an aim of certain embodiments of the present invention to increase a number of user equipment that can be supported by spatial multiplexing methods over and above a fundamental limit otherwise imposed by a particular number of aerial vehicles in use.

It is an aim of certain embodiments of the present invention to provide an augmented methodology whereby interference effects, caused by further devices which wirelessly communicate, but which are not part of a communication network formed by a particular set of aerial vehicles and user equipment, can be cancelled out thus improving a link quality for user equipment services provided by the aerial vehicles.

It is an aim of certain embodiments of the present invention to provide a method for connecting a mobile user equipment to a core network of a telecommunications network.

It is an aim of certain embodiments of the present invention to provide a method for maintaining a connection of mobile user equipment to a core network of a telecommunication network as the mobile user equipment moves.

It is an aim of certain embodiments of the present invention to provide a communication network which is able to connect mobile user equipment to a core network via a multi-channel communication link which provides a cell coverage area having a footprint with a width of less than 1 m.

It is an aim of certain embodiments of the present invention to provide a communication network for maintaining connection of mobile user equipment to a core network as the mobile user equipment moves.

According to a first aspect of the present invention there is provided a method for maintaining a connection of mobile user equipment to a core network, comprising the steps of:
provide a multi-channel communication link between a user equipment at a first location and a plurality of aerial vehicles;
determining that the user equipment is moving whereby a loss of connectivity via the multi-channel communication link may occur; and
subsequently, via a handover step, transferring communication between the user equipment and a core network from communication via the multi-channel communication link to communication via a single channel communication link provided by a respective aerial vehicle.

Aptly the method further comprises providing a single channel communication link by forming a beam, from a directional antenna of said a respective aerial vehicle, towards the ground that illuminates a first cell coverage area.

Aptly the first cell coverage area has a footprint with a width of greater than 100 metres and optionally greater than 500 metres.

Aptly the step of providing the first multi-channel communication link comprises:
co-operatively forming a beam, via respective directional antennas of the plurality of aerial vehicles, towards the ground that illuminates a further cell coverage area.

Aptly the further cell coverage area has a footprint with a width of less than 1 metre and optionally less than 0.5 metres.

Aptly a footprint of a cell coverage area comprises a region where a wireless signal strength is strong enough that a user equipment located within the cell coverage area can associate with the core network via an associated single channel communication link or a multi-channel communication link.

Aptly a footprint of a cell coverage area comprises a region defined by an imaginary boundary congruent with positions where a wireless signal strength of the single channel wireless communication link or multi-channel wireless communication link respectively is at a predetermined threshold level lower than a maximum signal strength or where a carrier to noise ratio of the communication link is at a predetermined threshold in the respective first or further cell coverage area.

Aptly the predetermined threshold level is around 9 dB.

Aptly the step of determining that the user equipment is moving, comprises:
providing a plurality of additional wireless communication links, that each provide a respective additional cell coverage area, having respective additional cell coverage areas geographically proximate to said a further cell coverage area;
transmitting a respective beacon signal to said a user equipment via each additional wireless communication link; and
determining that said a user equipment is moving responsive to a power level of the beacon signals received at the user equipment.

Aptly the method further comprises providing the additional cell coverage areas surrounding said a further cell coverage area.

Aptly the method further comprises responsive to received power levels of the beacon signals transmitted via the additional wireless communication links and received at the user equipment, estimating a direction of movement of the user equipment.

Aptly the method further comprises responsive to the estimated direction of movement, determining an expected location of the user equipment and relocating said a first cell coverage area proximate to the expected location.

Aptly the method further comprises, in real time, repeatedly relocating the first cell coverage area to an expected location of said user equipment.

Aptly the step of determining that the user equipment is moving comprises:
via the multi-channel wireless communication link, instructing said a user equipment to transmit an uplink reference signal;
at each aerial vehicle, receiving the transmitted uplink reference signal; and
determining that a user equipment is moving responsive to the received reference signal, received at each aerial vehicle.

Aptly the method further comprises instructing said a user equipment by transmitting a reference signal request to said a user equipment.

Aptly the method further comprises transmitting the reference signal request about around every 2 ms.

Aptly the method further comprises determining an expected location of the user equipment and responsive to the expected location, relocating said a first cell coverage area proximate to the expected location.

Aptly the method further comprises, in real time, repeatedly relocating the first cell coverage area to an expected location of said user equipment.

Aptly the method further comprises, responsive to determining that a user equipment is moving, determining that the user equipment is moving in a direction whereby a loss of connection via the first multi-channel wireless communication link is likely.

Aptly the method further comprises determining that a loss of connection is likely by determining at least one likely wireless propagation characteristic for the expected location and determining that a loss of connection is likely if the at least one propagation characteristic satisfies a predetermined condition.

Aptly the method further comprises determining that a loss of connection is likely by determining that the expected location is more than a predetermining distance from a centre point associated with the first cell coverage area.

According to a second aspect of the present invention there is provided a communication network, comprising:
a plurality of aerial vehicles that each supports at least one respective directional antenna; and
a processing element for registering a cell having a first cell coverage area and provided via a single channel wireless communication link, with a core network and for registering a further cell having a further cell coverage area, and provided via a multi-channel wireless communication link, with the core network; wherein
the processing element is arranged to issue a request for a user plane path switch for the user equipment if communication between the user equipment and the core network is to be transferred from communication via the multi-channel wireless communication link to communication via the single channel wireless communication link.

Aptly the network further comprises:
a ground based cell processing centre that comprises the processing element and includes at least one interface to the core network and optionally includes an aerial vehicle flight control unit and a beamforming control unit; and
at least one ground station, each comprising a directional antenna element, arranged to relay user data and control information between each aerial vehicle and the cell processing centre.

Aptly the processing centre comprises a user plane external interface (SI) connectable to a serving gateway (S-GW) of the core network and a further interface (SI-MME) for delivering signalling protocols to a mobility management entity (MME) of the core network.

Aptly the processing centre is arranged to create and maintain a respective virtual or physical base station for each further cell.

Aptly the processing centre further comprises a fronthaul interface for connecting a virtual base station with one or more antennas on respective aerial vehicles.

Aptly the network further comprises at least one user equipment; and
each aerial vehicle comprises a high altitude platform (HAP) and each antenna on each HAP is arranged as a remote radio head (RRH) for communicating wirelessly with each user equipment.

Aptly each aerial vehicle is a HAP at an altitude of at least 10 km above sea level.

According to a third aspect of the present invention there is provided a computer readable storage medium comprising instructions which, when executed by a computer, cause the computer to carry out the method of wireless communication between at least one user equipment and a plurality of aerial vehicles, comprising the steps of
providing a multi-channel communication link between a user equipment at a first location and a plurality of aerial vehicles;
determining that the user equipment is moving whereby a loss of connectivity via the multi-channel communication link may occur; and
subsequently, via a handover step, transferring communication between the user equipment and a core network from communication via the multi-channel communication link to communication via a single channel communication link provided by a respective aerial vehicle.

Certain embodiments of the present invention provide a communication network that includes a processing element, which may be in an aerial vehicle or in a ground based processing centre, that can determine one or more propagation characteristics for wireless communication channels associated with respective multi-channel and/or single channel wireless communication links between ground based user equipment and aerial vehicles. This data can be used to create a channel matrix and a pseudo inverse channel matrix which can be selectively applied to transmitted and received signals in the uplink and downlink direction allowing interference free concurrent data communication with all user equipment.

Certain embodiments of the present invention provide a method of determining at least one propagation characteristic for each wireless communication channel between one or more user equipment and a plurality of aerial vehicles.

Certain embodiments of the present invention provide a communication network which includes multiple aerial vehicles, such as a constellation of HAPs, a processing element in an aerial vehicle or in a processing centre, and optionally one or more ground stations that can be used as relays to relay user data and control information between every HAP and the processing element.

Certain embodiments of the present invention provide for a grouping scheme whereby a number of user equipment that can be supported for wireless communication is greater than that which might otherwise be supported by the specific number of aerial vehicles provided. Aptly this grouping scheme comprises a user time-frequency resource scheduling methodology at times when a number of user equipment exceeds a predetermined maximum number of possible concurrent data transmissions.

Certain embodiments of the present invention enable interference from/to other wireless communication devices, that do not form part of the communication network served by a plurality of aerial vehicles, to be cancelled out as part of the process by which the aerial vehicles communicate with their designated user equipment. This helps improve communication quality for all devices.

Certain embodiments of the present invention provide a method and communication network for connecting mobile user equipment to a core network whereby communication occurs initially via a single channel wireless communication link, which provides a cell coverage area which is relatively large, and thereafter, via a handover step, communication occurs via a multi-channel wireless communication link with a smaller cell coverage area.

Certain embodiments of the present invention provide a method and communication network for maintaining a connection of a mobile user equipment to a core network as the user equipment moves. Communication occurs via a multi-channel communication link with a relatively small cell coverage area and then when it is determined that the user equipment is moving in a way which means loss of connectivity is likely, a handover step occurs transferring communication to communication via a single channel communication link which has a larger cell coverage area. Thereafter, optionally, a further handover step can occur to transfer communication back to a multi-channel communication link which has a small cell coverage area if/when movement is such that a small cell coverage area is likely to be able to maintain a link.

Certain embodiments of the present invention provide a communication network which comprises at least one airborne antenna for transmitting and receiving signals between the antenna and a user equipment and at least one antenna for transmitting and receiving signals with a base station which is connection with a surface mounted processing centre. The processing centre includes a control interface and a cellular interface in connection with a core network.

Certain embodiments of the present invention enable a user tracking methodology for maintaining a connection of mobile user equipment to a core network.

Certain embodiments of the present invention provide a process for acquiring a mobile network user via a wide coverage cell, determining their location using aerial antennas mounted on HAPs and handing over the user device to a narrow cell formed by aerial antennas mounted on two or more HAPs.

Certain embodiments of the present invention provide apparatus performing precise channel estimation exploiting some conventional cellular signalling and aerial antennas mounted on multiple HAPs to allow user locations to be detected to an accuracy of less than 0.5 m (that is to say considerably more accurately than conventional techniques allow).

Certain embodiments of the present invention provide for the use of multiple HAPs that transmit overlapping beams containing beacons with different physical cell IDs (or synchronised sequences).

Certain embodiments of the present invention provide for the use of beacon signals from different HAPs for user equipment-assisted positioning. A user equipment can be requested to measure and observe time difference of arrival (OTDoA) of signals from different HAPs and report that back to a serving cell base station.

Certain embodiments of the present invention provide for a process of using receiver antennas mounted on multiple HAPs to estimate a user location based on an uplink reference signal (URS).

Certain embodiments of the present invention enable the formation and steering of ultra-narrow cells to within 0.5 m of a user's location.

Certain embodiments of the present invention provide for the handover of a user from a wide coverage cell to an ultra-narrow cell formed by aerial antennas mounted on multiple HAPs.

Certain embodiments of the present invention provide for a handover of a user equipment from an ultra-narrow cell, formed by aerial antennas mounted on multiple HAPs, to a wide coverage cell formed by fewer HAPs or optionally by a single HAP.

Certain embodiments of the present invention provide a process and apparatus for enabling cellular devices to be simultaneously connected with a first cell formed by aerial antennas mounted on multiple HAPs and to a further cell formed by fewer HAPs (and optionally a single HAP) or a terrestrial base station.

A user device location can be defined either geographically or in terms of a phase shift and attenuation of Radio Frequency (RF) signals between the user device and aerial antennas mounted on HAPs. Thus, for certain embodiments of the present invention, if a user device does not have line-of-sight connection with the HAPs but uses reflected and/or shadowed radio propagation paths, a user's apparent location can nevertheless be determined and expressed as a channel phase shift and attenuation of the reflected/shadowed paths between the user and the HAPs. This information can be used to form a narrow cell using aerial antennas mounted on two or more HAPs.

Certain embodiments of the present invention will now be described hereinafter, by way of example only, with reference to the accompanying drawings in which.

Figure 5:
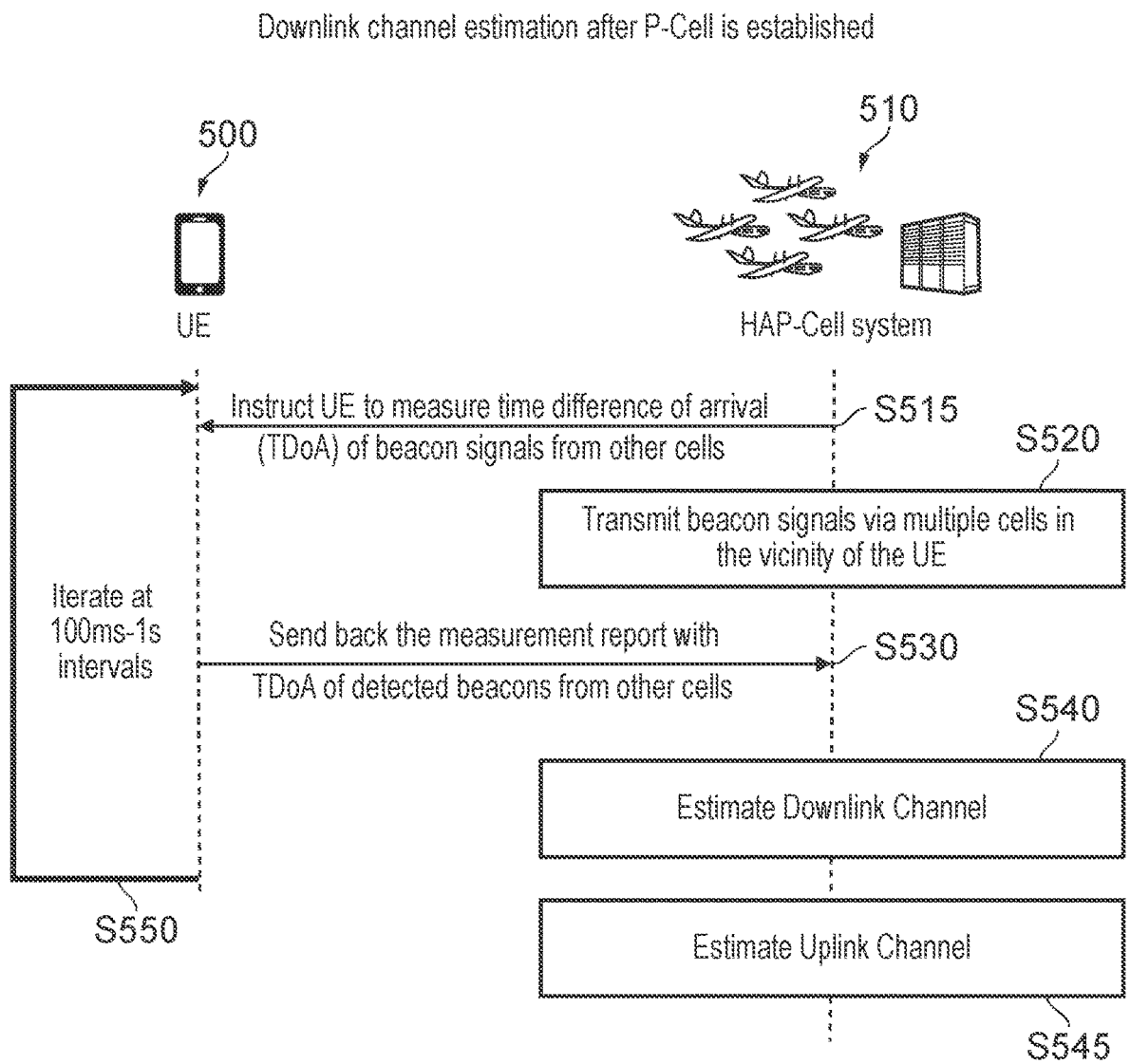
Figure 6:
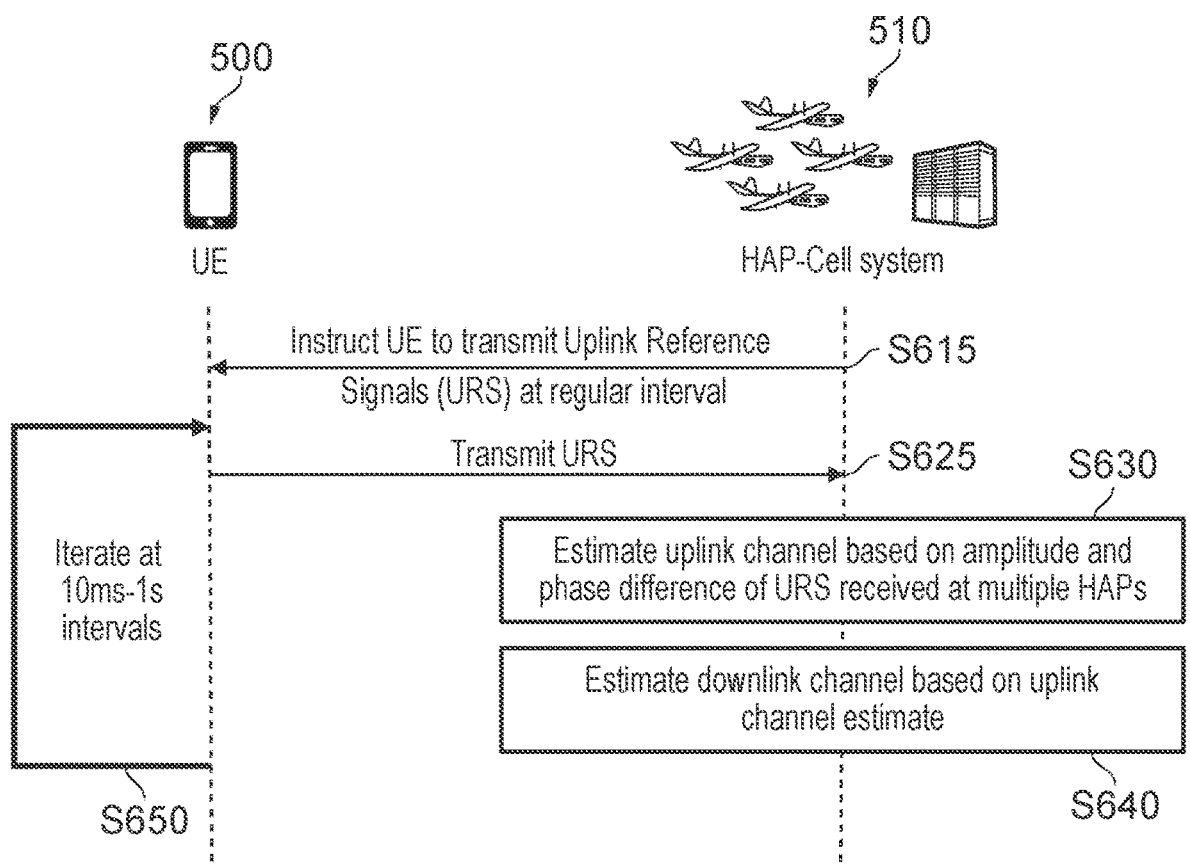
Figure 7:
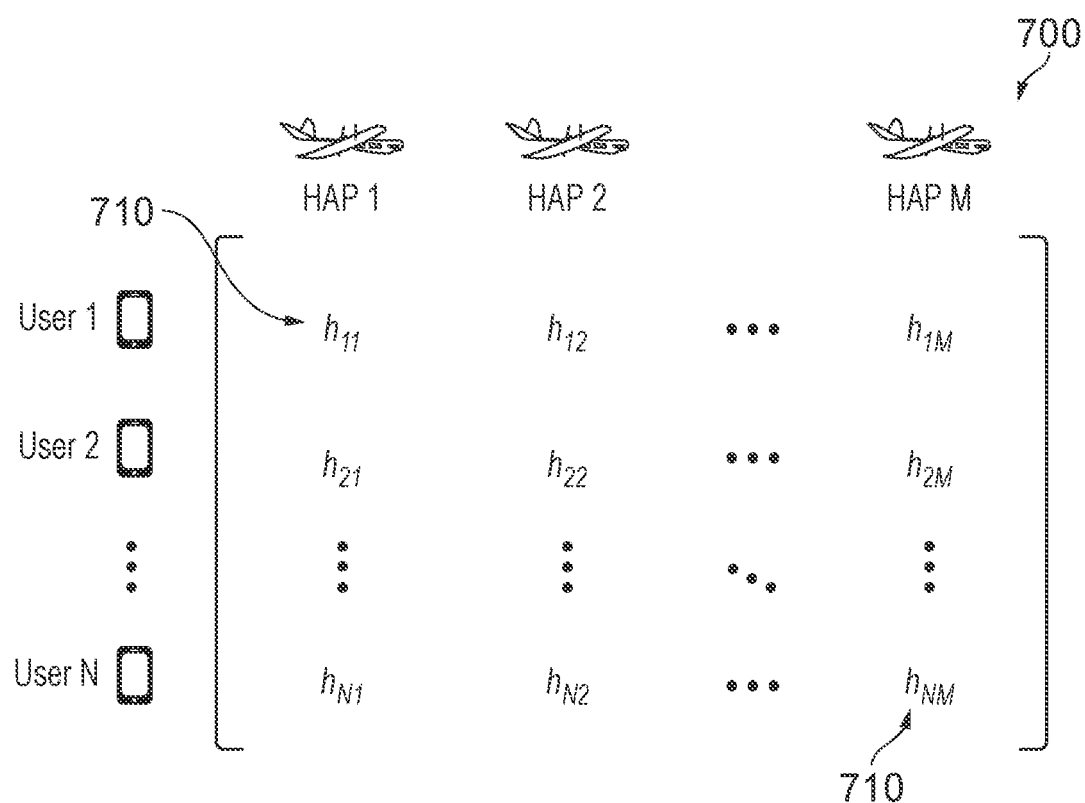
Figure 8:
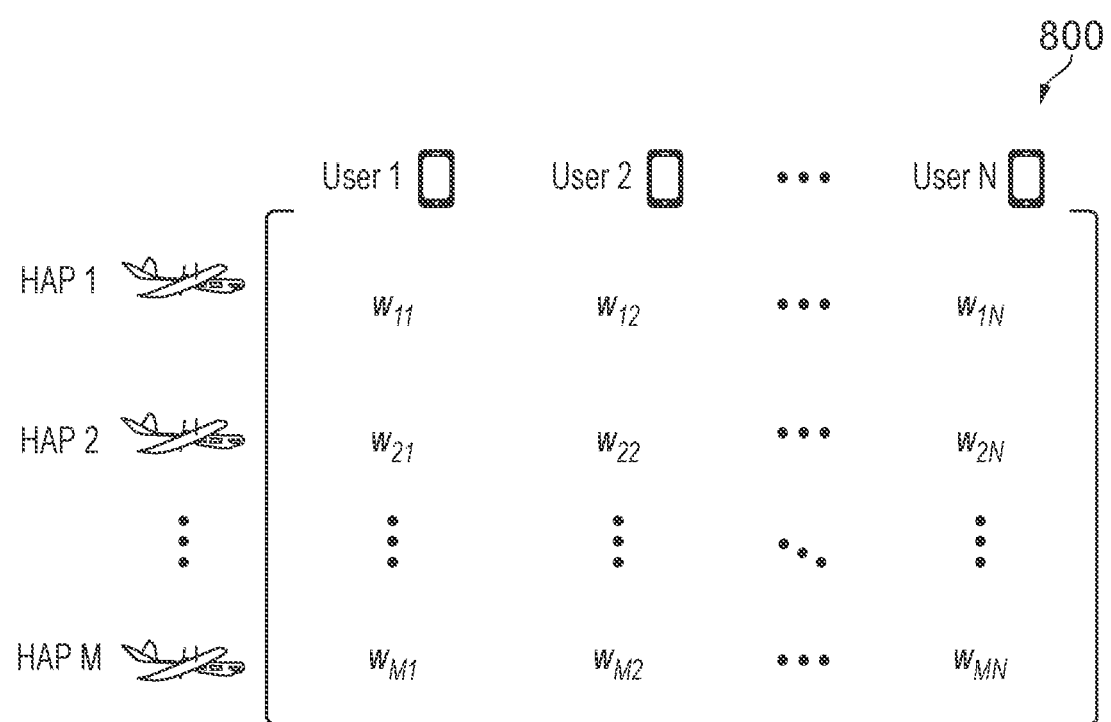
Figure 9:
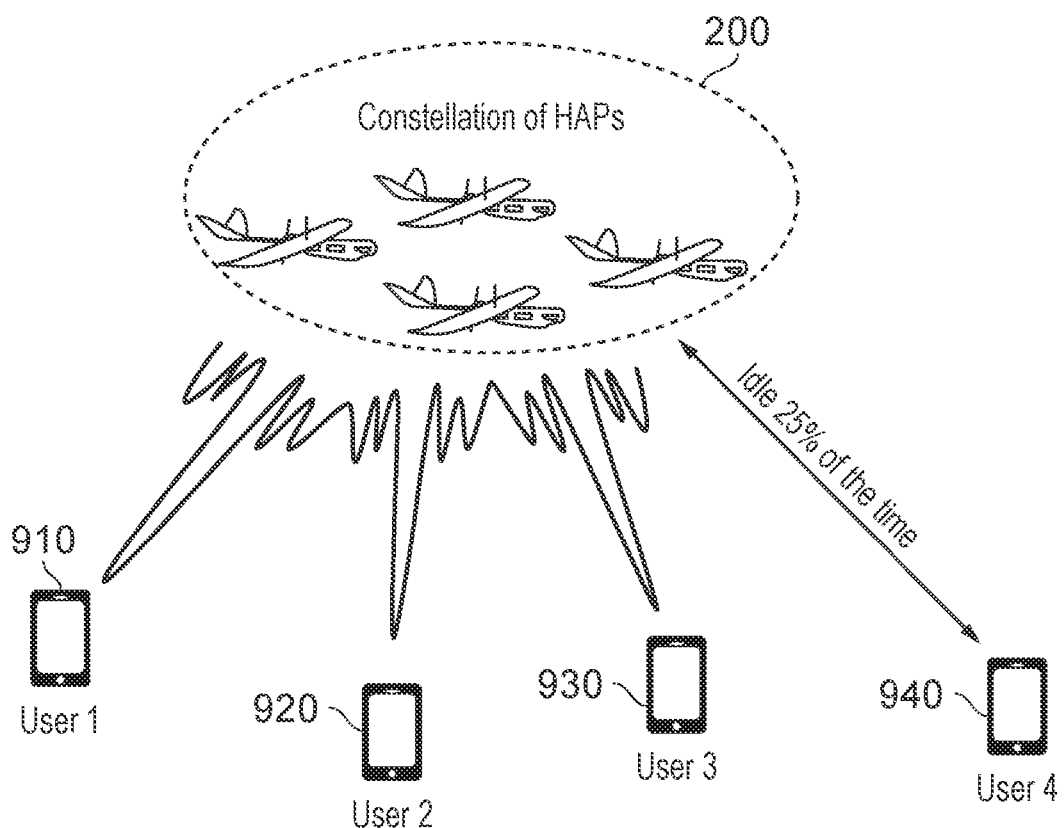
Figure 10:
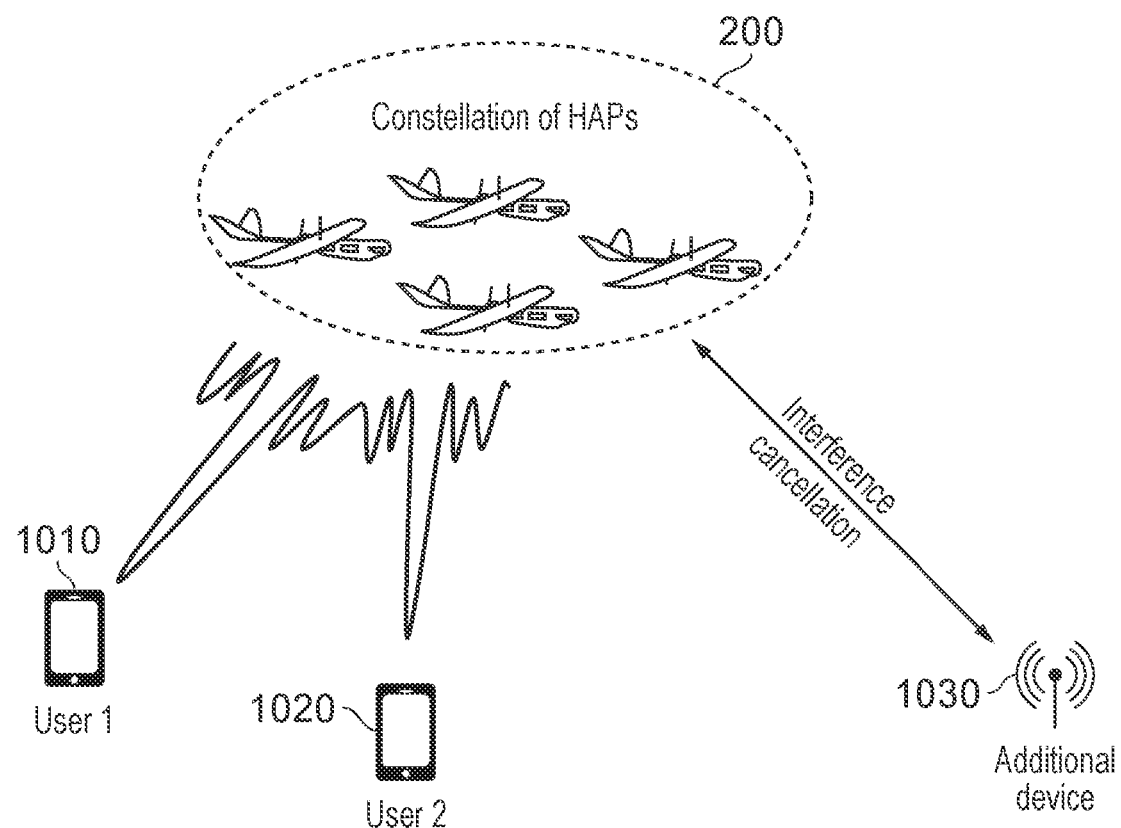
Figure 11:
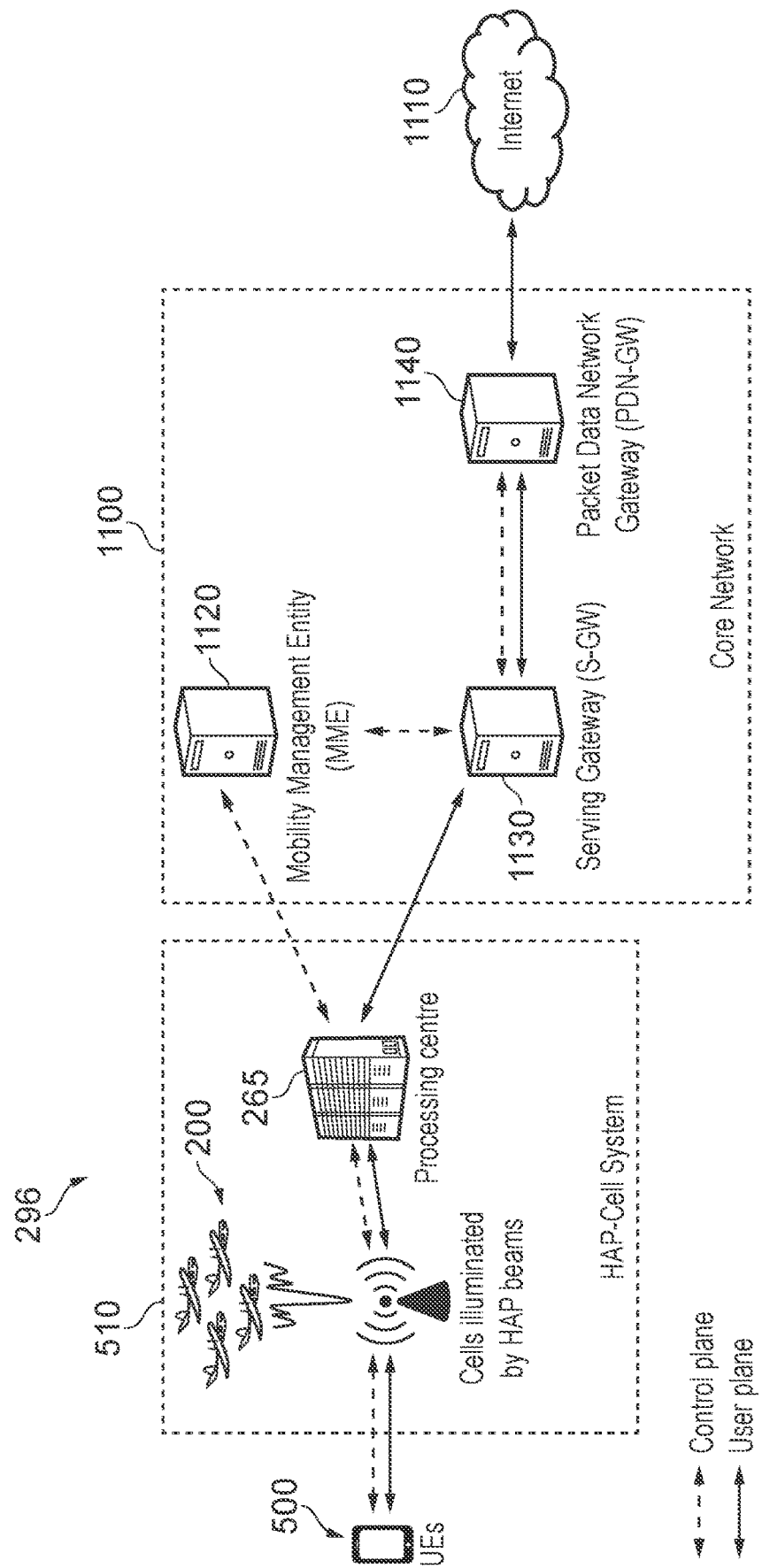
Figure 12:
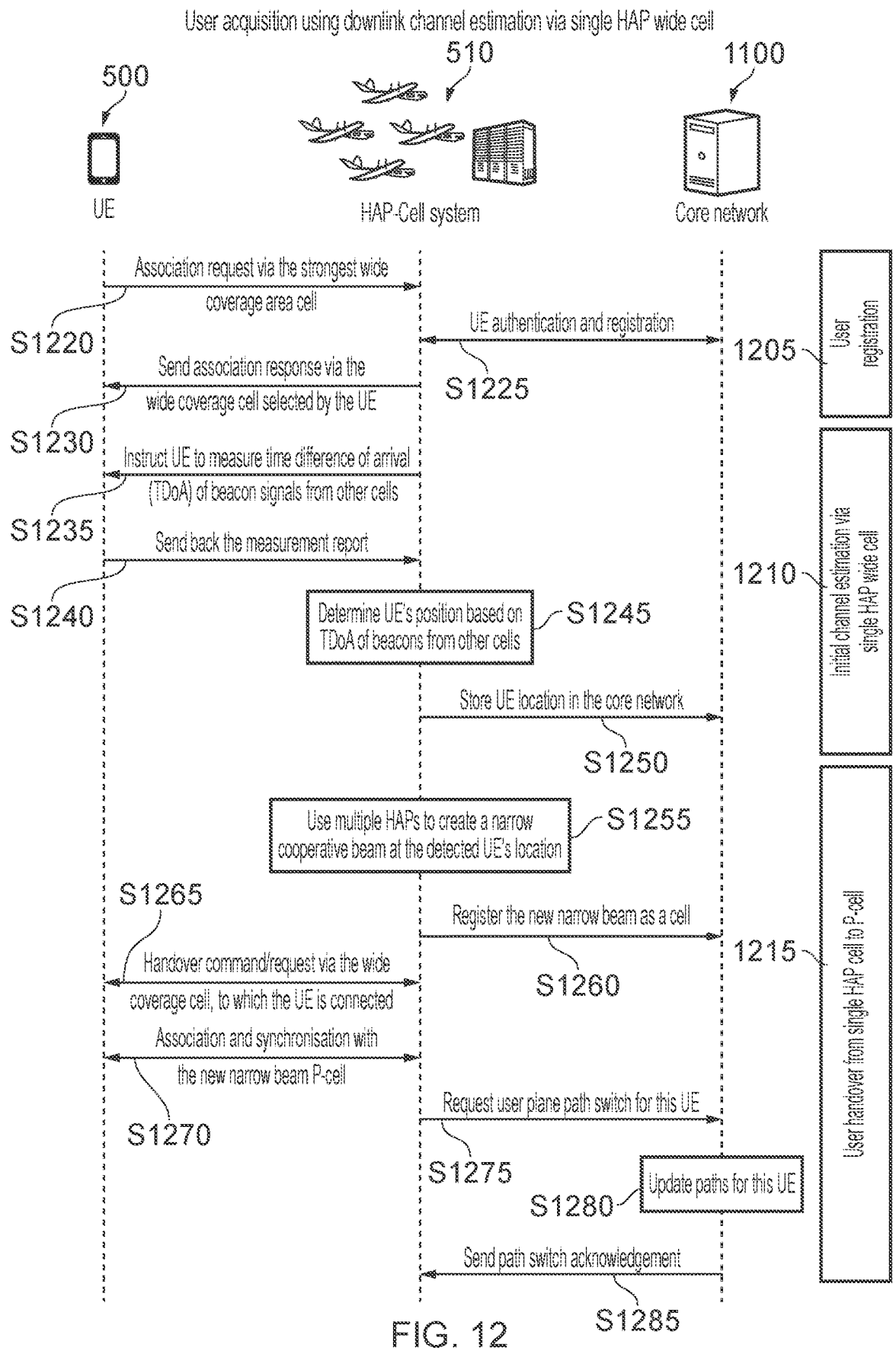
Figure 13:
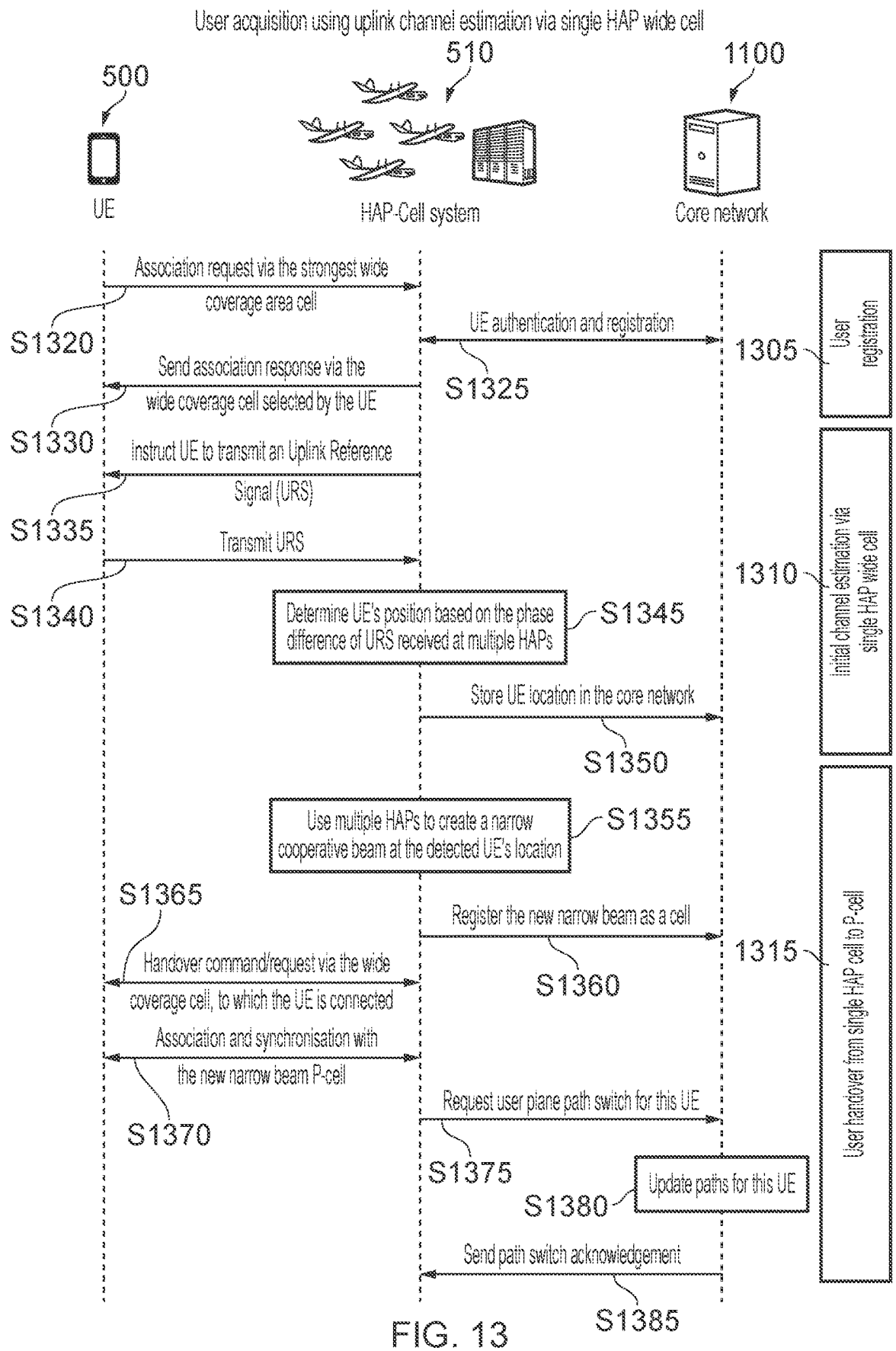
Figure 14:
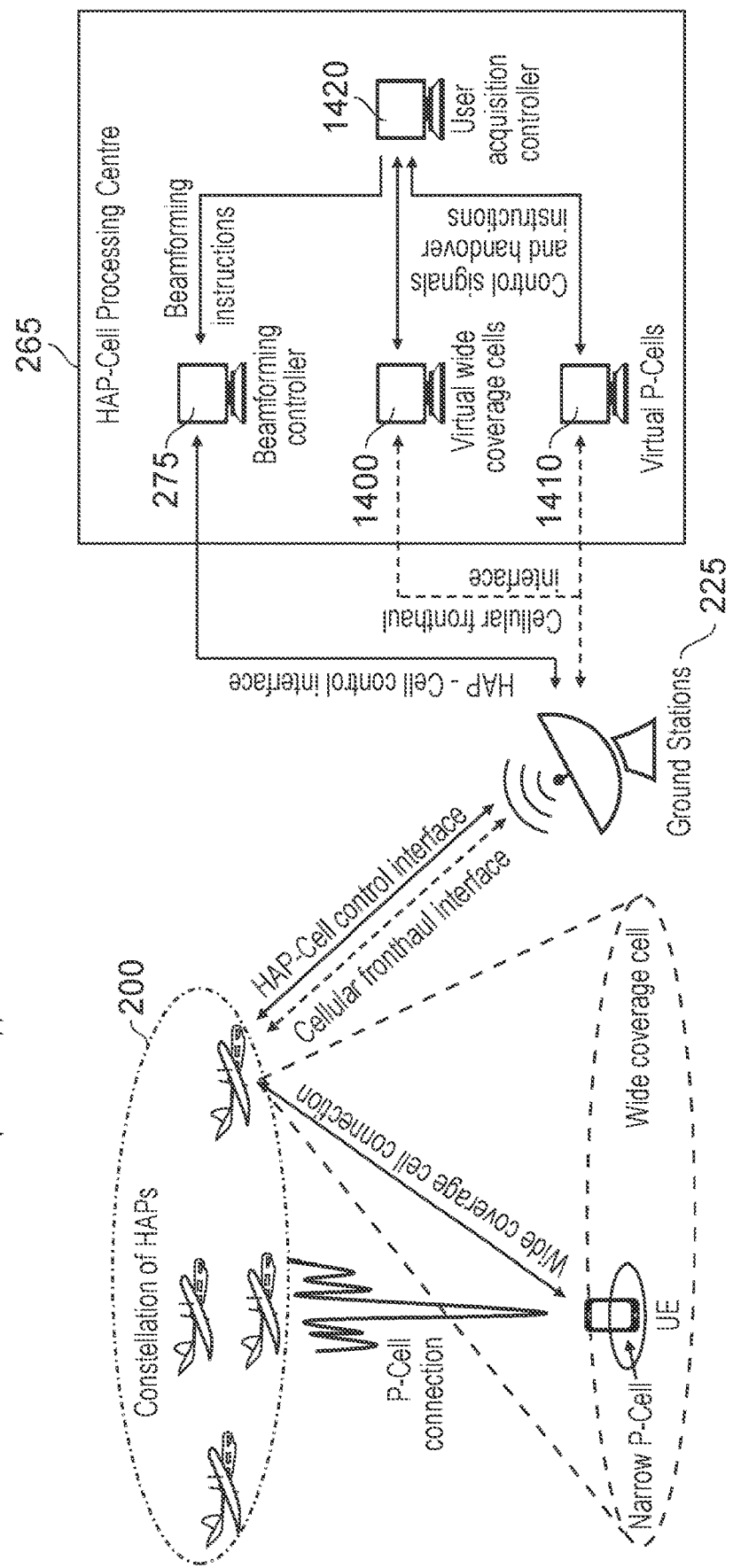
Figure 17:
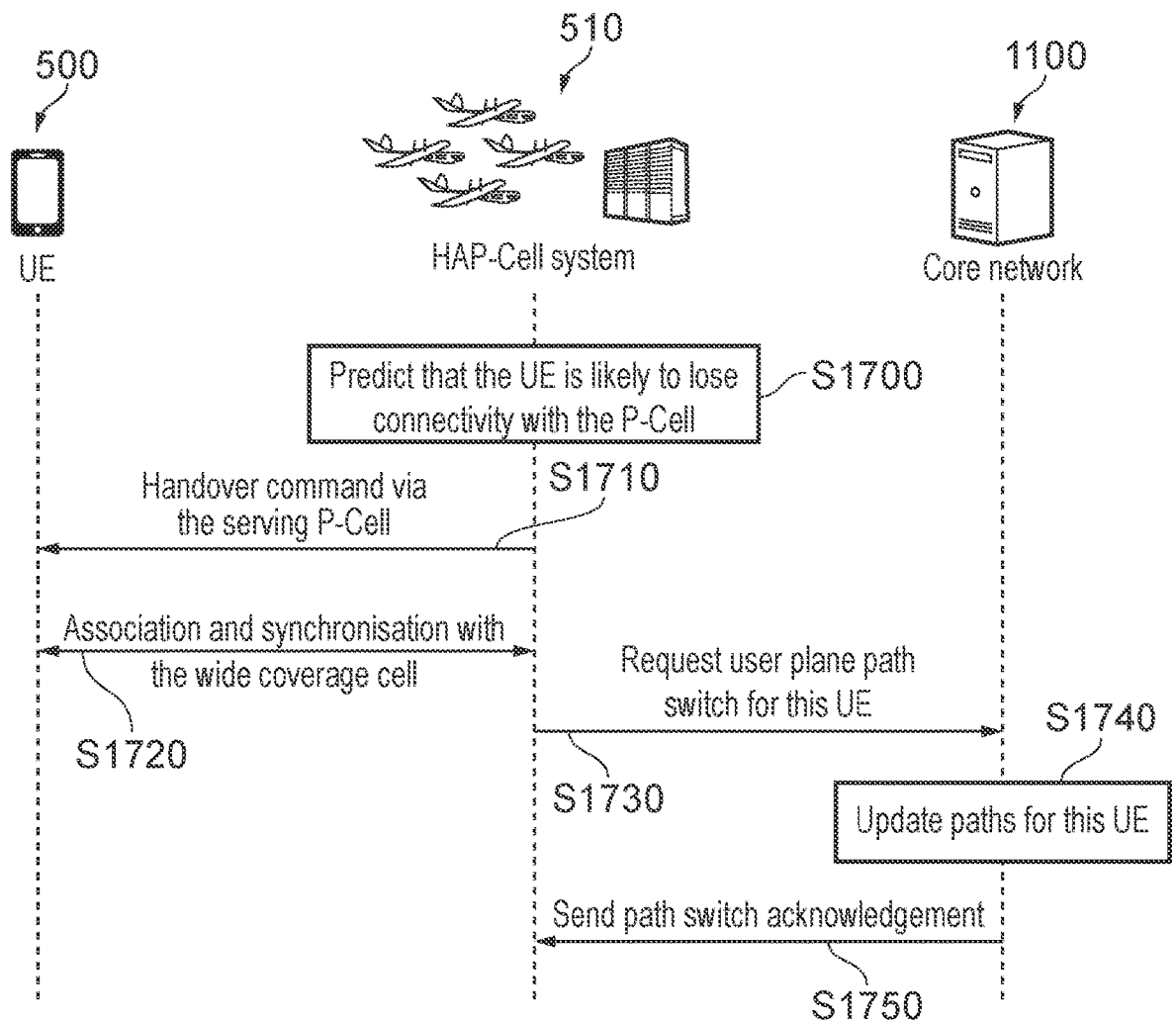
Figure 18:
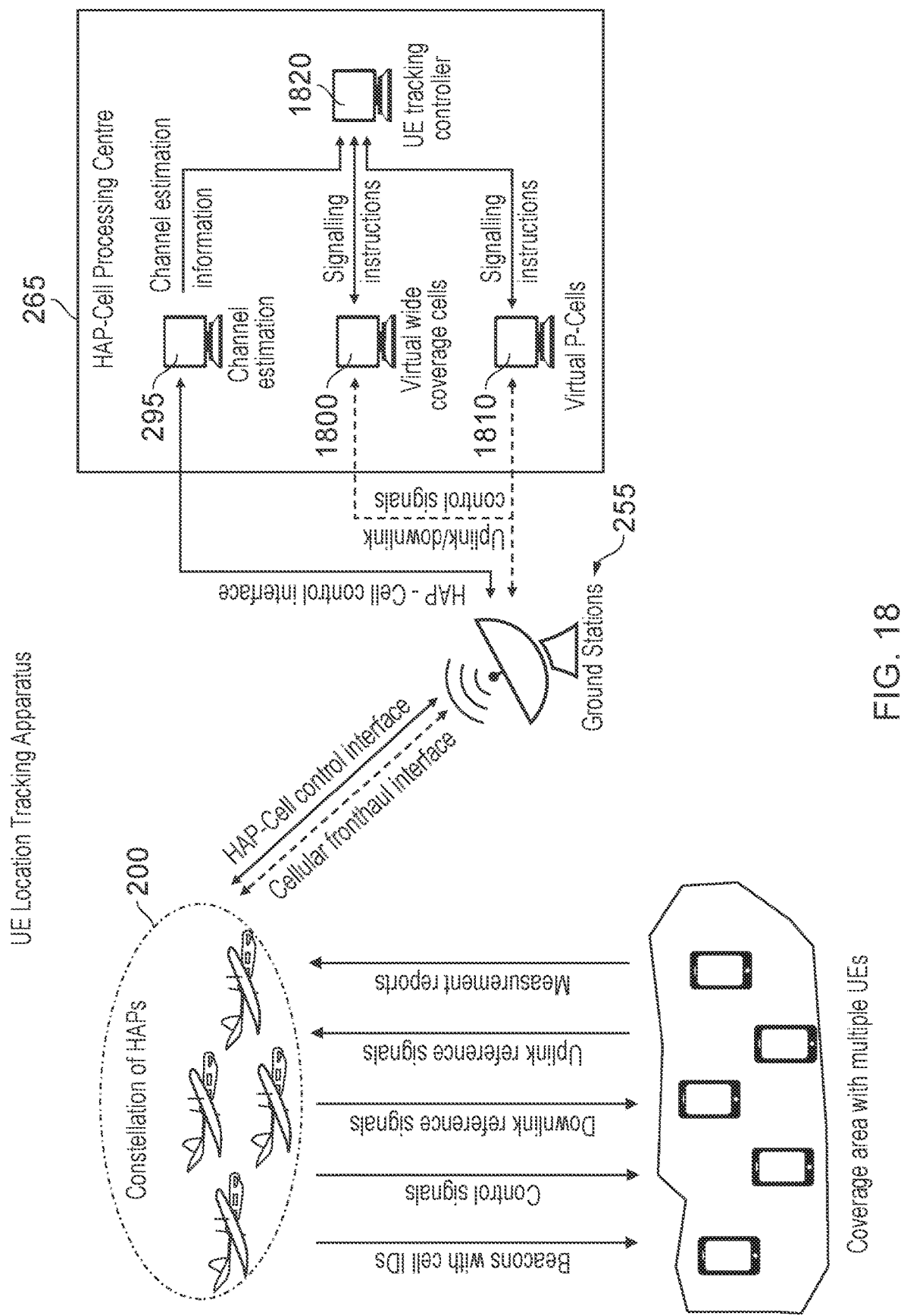
Figure 19:
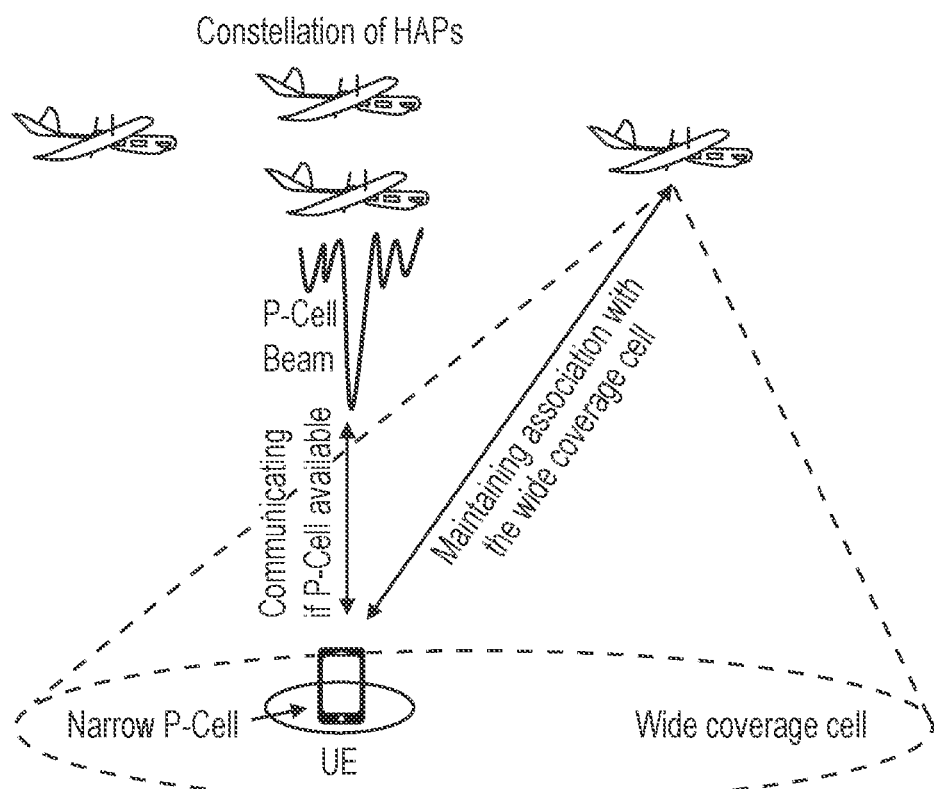
Figure 20:
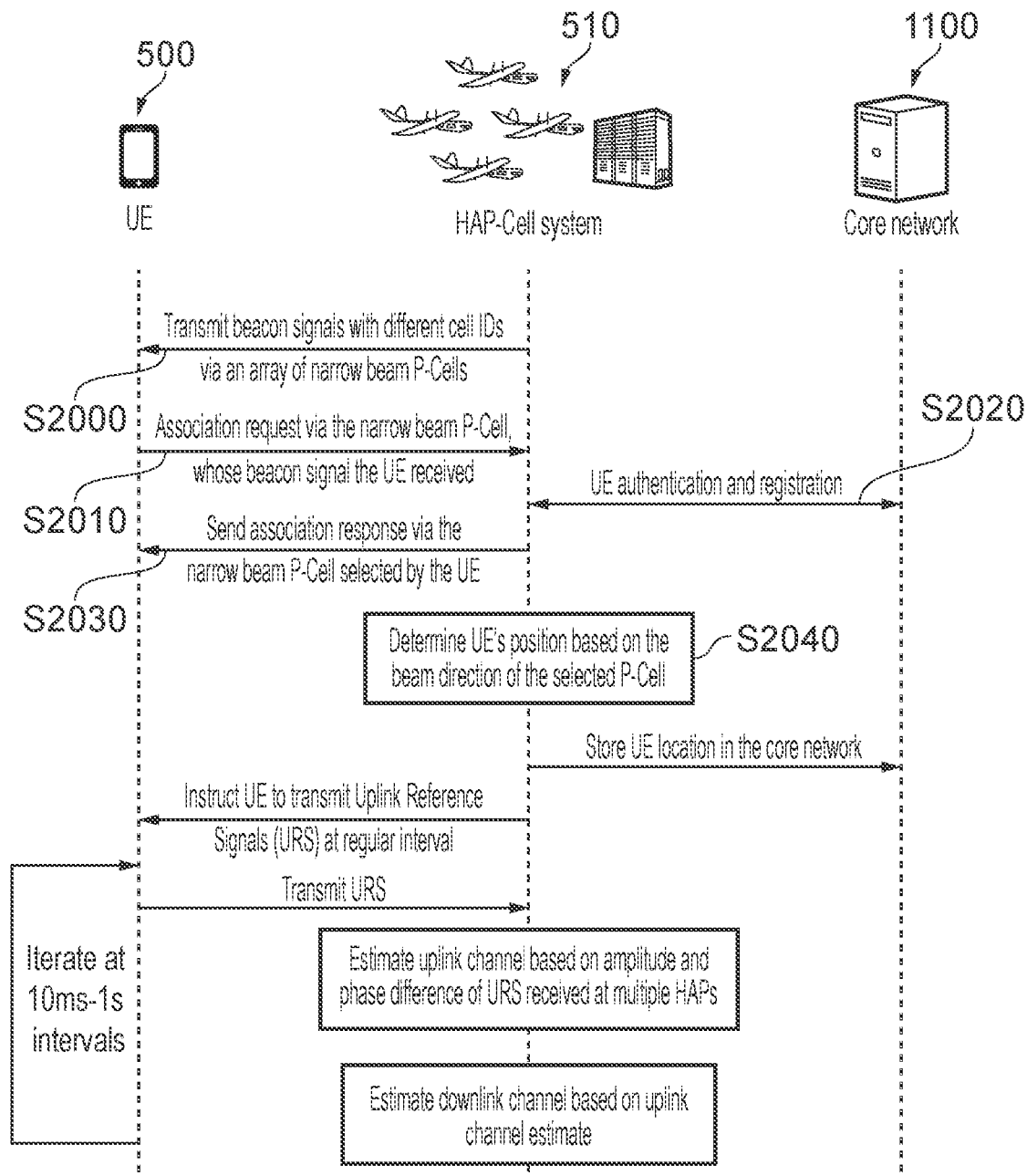

FIG. 3 schematically illustrates a way for estimating a wireless channel;

FIG. 4 schematically illustrates an alternative way for estimating a wireless channel;

FIG. 5 illustrates downlink channel estimation after a P-cell, provided by a multi-channel wireless communication link, has been established and using measured arrival time of downlink signals;

FIG. 6 illustrates channel estimation after a P-cell, provided by a multi-channel wireless communication link, has been established and using uplink reference signals;

FIG. 7 illustrates a channel matrix;

FIG. 8 illustrates a weight matrix;

FIG. 9 illustrates grouping of user equipment;

FIG. 10 illustrates interference cancelling;

FIG. 11 illustrates a HAP-Cell system integrated with a cellular architecture and illustrates certain selected elements associated with a core network node in more detail;

FIG. 12 illustrates user acquisition using downlink channel estimation;

FIG. 13 illustrates user acquisition using uplink channel estimation;

FIG. 14 illustrates user acquisition apparatus;

FIG. 15 illustrates user equipment tracking using downlink control signals;

FIG. 16 illustrates user tracking apparatus;

FIG. 17 illustrates a handover step used to avoid loss of connectivity;

FIG. 18 illustrates user equipment location tracking apparatus;

FIG. 19 illustrates a user equipment simultaneously communicating with both a wide coverage cell and a narrow P-cell to help maintain a robust connection and avoid loss of connectivity; and FIG. 20 illustrates user acquisition and channel estimation without an initial aerial vehicle link to user equipment.

In the drawings like reference numerals refer to like parts.

Certain embodiments of the present invention provide for high speed broadband services from high altitude platforms (HAPs). A HAP may be an aircraft or lighter than air structure 10 to 35 km above sea level. A High Altitude Long Endurance (HALE) aircraft or free flying or tethered aerostat can be an example of a HAP. A HAP is an example of an aerial vehicle.

Other such aerial vehicles such as tethered vehicles or manned aircraft or the like can be utilised according to other embodiments of the present invention. Aptly each aerial vehicle is deployed at least 5 km above sea level. Aptly each aerial vehicle can be deployed in the stratosphere at an altitude above sea level of around 17 to 22 km. HAPs cover significantly wider areas with Line-of-Sight (LoS) links compared to conventional terrestrial systems and do not suffer from capacity and propagation delay limitations associated with satellites.

Figure 1:
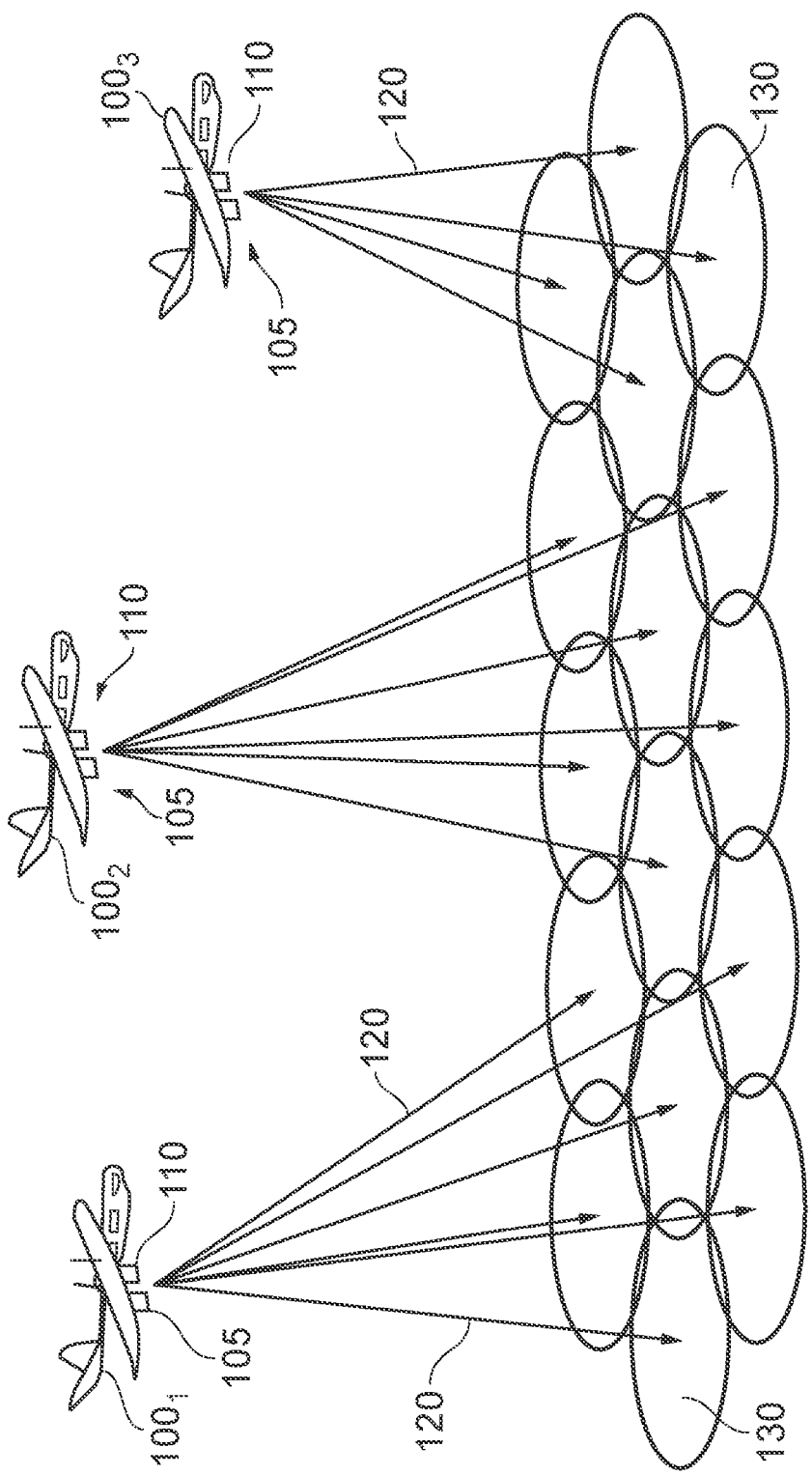
FIG. 1 illustrates multiple aerial vehicles providing cellular coverage to user equipment via multiple possible single channel wireless communication links.

FIG. 1 illustrates how multiple aerial vehicles 100 (three HAPs shown in FIG. 1) can provide wireless services to user equipment. A user equipment can be a mobile phone, tablet or laptop or PDA or the like. Each user equipment described hereinbelow, by way of example only, is a smartphone. Each aerial vehicle described hereinbelow, by way of example only, is a HAP. Each HAP shown is equipped with one or more directional antenna 105,110. Aptly each directional antenna is a multi-element phased array antenna. Such antenna and their general control is described in GB2536015 the disclosure of which is incorporated herein by reference.

As shown in FIG. 1 each aerial vehicle 100 alone can form one or more beams 120 which are directed to the ground thus illuminating 'cells'. The beams provided by a single HAP can be used to provide a single channel wireless communication link between the respective HAP and a user equipment in each cell. The wireless communication link is two way or bidirectional in the sense that uplink and downlink transfer of data can be supported. The cells 130 can be perceived by the user equipment as conventional terrestrial wireless telecommunication cells. The locations and density of cells created by the HAPs are dynamically controllable. Each aerial vehicle supports at least one directional antenna. In FIG. 1 each vehicle supports a transmission antenna 105 and a reception antenna 110. Optionally there can be phased array antenna or horns. Each phased array antenna can comprise an array of small antenna elements.

Each single channel wireless communication link is formed over the channel between a single user equipment and a single HAP. The single channel communication link is provided by forming a beam, from a directional antenna of a respective aerial vehicle, towards the ground that illuminates a first cell coverage area. The first cell coverage area has a relatively wide footprint and may thus be referred to as a wide cell. Aptly the footprint has a width of greater than 500 m. The single channel communication link enables synchronisation and/or association and/or exchange of control signals between a respective user equipment and a respective HAP and a core network.

A footprint of a first cell coverage area provided by any one HAP comprises a region where a wireless signal strength is strong enough that a user equipment located within the cell coverage area can associate with the core network via an associated wireless communication link. Aptly a footprint of a cell coverage area is a region defined by an imaginary boundary congruent with positions where a wireless signal strength of a communication link is at a predetermined threshold level lower than a maximum signal strength in the cell coverage area. Optionally the predetermined threshold is around 9 dB.

Optionally the HAPs 100 utilise co-operative aerial inter-platform beamforming (CAIB). Such a co-operative beamforming scheme can be performed across multiple HAPs to decrease beam size and increase radio resource usage efficiency of the radio spectrum. With this technique it is possible for multiple aerial vehicles to create effective beams that provide a wireless communication link between those multiple HAPs and a single user equipment. These co-operatively formed effective beams can be provided for many individual users illuminated via smaller cells. These smaller cells have a footprint that can be as small as 10 to 100 cm in width. As such the cells may be thought of as personal cells (P-Cells) as their scale approximates to the size of a person using the user equipment. The same group of HAPs can simultaneously provide multiple cooperatively formed beams for multiple smartphones. This provides multiple respective multi-channel wireless communication links.

Each multi-channel wireless communication link is formed across the multiple channels between any one user equipment and the HAPs in a constellation of HAPs which cooperatively beam form to create the multi-channel wireless communication link. The multi-channel communication link enables synchronisation and/or association and/or exchange of control signals. Each multi-channel communication link can be provided by cooperatively forming a beam, via respective directional antennas of a plurality of aerial vehicles, towards the ground that illuminates a cell coverage area.

A single channel communication link provides a first cell coverage area. A multi-channel communication link illuminates a further cell coverage area. A further cell coverage area has a footprint which is much smaller than the associated footprint provided by a single channel communication link. Aptly the further cell coverage area which is a cell coverage area provided by a multi-channel communication link has a footprint with a width of less than 1 m. Optionally the further cell coverage area has a footprint with a width of less than 0.5 m. These may be thought of as narrow or ultra-narrow cells.

A footprint of the further cell coverage area provided by a multi-channel communication link comprises a region where a wireless signal strength is strong enough that a user equipment located in the further cell coverage area can associate with a core network via an associated multi-channel communication link. Aptly a footprint of a further cell coverage area comprises a region defined by an imaginary boundary congruent with positions where a wireless signal strength of the multi-channel wireless communication link is at a predetermined threshold level lower than a maximum signal strength in the further cell coverage area. Aptly the predetermined threshold is around 9 dB.

Each wireless communication link is thus provided via one or more respective channels. A channel is a pathway or medium through which data can be wirelessly communicated between any two points. Beams provided between a single HAP and a single user equipment are single channel in the sense that they have a single source and a single sink. Beams provided between a single user equipment and multiple HAPs are multi-channel in the sense that they have multiple sources and a single sink or a single source and multiple sinks (depending upon whether a uplink or downlink transmission is occurring).

Figure 2:
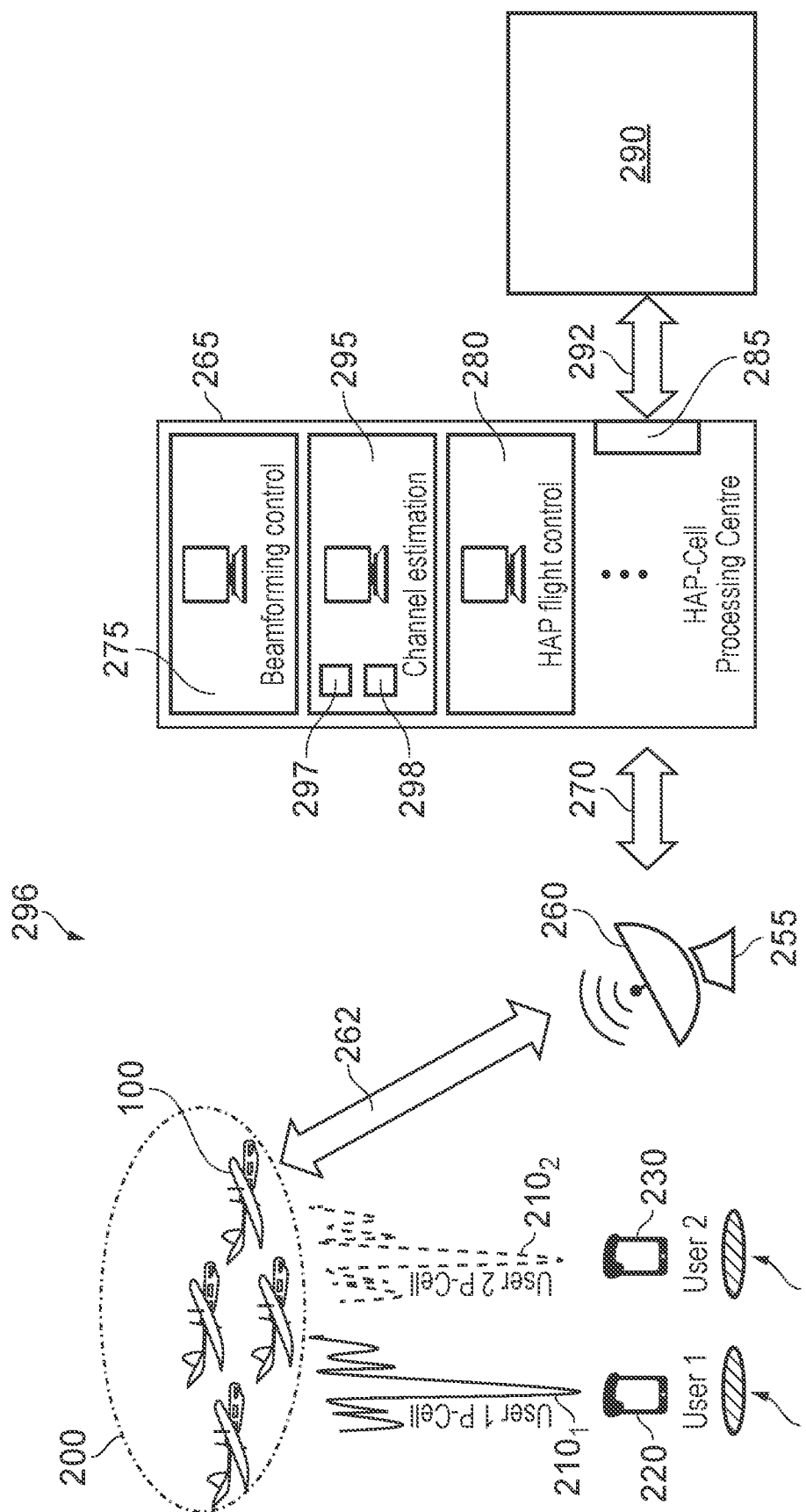
FIG. 2 illustrates a constellation of HAPs providing two multi-channel wireless communication links to respective user equipment.

FIG. 2 schematically illustrates a plurality (referred to as a constellation 200) of HAPs (four shown in FIG. 2) together providing two simultaneous multi-channel wireless communication links 210. Each multi-channel wireless communication link 210 is provided via a co-operative beamforming technique with a respective user equipment 220,230 as its target. For the example shown in FIG. 2 this provides two respective P-Cells 240,250 each formed on a location of a respective user equipment. Each P-Cell 240, 250 has a footprint that is much smaller in area than a corresponding footprint of a cell 130 provided by a single HAP alone via a respective single channel wireless communication link provided without beamforming with other HAPs.

As illustrated in FIG. 2 the constellation 200 of HAPs communicate wirelessly with one or more ground station 255 (one shown in FIG. 2). Each ground station 255 includes a directional antenna 260 and the ground station can relay, using a respective wireless connection 262, user data and control information between every HAP and a cell processing centre 265. The processing centre 265 shown in FIG. 2 is a HAP-Cell processing centre. This may be located adjacent to or be part of the ground station or, as shown in FIG. 2, may be connected to the ground station/s 255 via a wired connection 270. Optionally a wireless connection can connect the ground station/s to the processing centre.

The HAP-Cell processing centre is provided with significant computational capability. The processing centre controls the operation of the HAP-based access network. The processing centre 265 can include a beamforming control unit 275 that runs processes for beamforming control. The processing centre can include a HAP flight control unit 280 that runs processes for controlling the flight of each aerial vehicle (such as location flight path and/or altitude). The processing centre 265 includes at least one interface 285 with a core network 290 via a respective wired or wireless connection 292.

For providing co-operative beamforming across aerial antennas mounted on the HAPs accurate channel estimation for every wireless communication channel between each HAP and each user equipment is performed. This is processed via a processing element 295 in the processing centre 265. This can be achieved in different ways as described below using wireless signals on either the downlink or the uplink. The processing element 295 may be a processor. This is used to indicate a central processing unit (CPU) or electronic circuit within a computer or a computer configured to carry out instructions of a computer programme. It will be understood in what follows that stating that a processor implements an action or that the processor is configured to implement an action is analogous to stating that the processor is configured to execute computer readable instructions and implement or execute an action. It is likewise to be understood that the term "computer" is intended to mean an assembly of components e.g. a processor, memory element, input device and output device arranged to receive inputs, produce outputs, store information and algorithms and execute instructions. It is not intended to be limited to any specific arrangement or group of components. For the avoidance of doubt the processor may optionally be a general purpose processor, co-processor or special-purpose processor such as, for example, a network or communication processor, compression engine, high throughput many integrated core co-processor, embedded processor or the like. The processor may be implanted on one or more chips. The chips can be proximate to one another or interconnected at different locations. The processor may be a part of and/or may be implemented on one or more substrates using any number of processed technologies, such as, for example, BiCMOS, CMOS or EMOS.

FIG. 2 thus helps illustrate a communication network 296. The communication network includes a plurality of aerial vehicles (HAPs shown in FIG. 2) that each supports at least one respective directional antenna. A processing element 297 (shown in FIG. 2 as part of the channel estimation unit 295) for determining at least one propagation characteristic for each respective wireless communication channel between at least one user equipment and each aerial vehicle of the plurality of vehicles. The processing element 297 determines the propagation characteristic, for each wireless communication channel. This can be achieved by comparing an amplitude and phase (equivalent to comparing an indicator of amplitude and/or an indicator of phase) of a received wireless signal transmitted via the respective wireless communication channel with a predetermined reference amplitude and reference phase or associated indicator. The communication network further includes a ground based cell processing centre 265 (that in FIG. 2 includes the processing element) and includes at least one interface to a core network 290. Optionally the ground based cell processing centre 265 includes an aerial vehicle flight control unit 280 and a beamforming control unit 275. It will be appreciated that flight control and beamforming control and channel estimation could be carried out at an alternative node or other alternative nodes in the overall communication network. The communication network 296 also includes at least one ground station 255. Each ground station includes a directional antenna element 260. The ground station is arranged to relay user data and control information between each aerial vehicle and the cell processing centre 265. As illustrated in FIG. 2 the communication network may also comprise at least one user equipment in the form of a smartphone, mobile phone, tablet or the like. FIG. 2 illustrates two smartphones.

FIG. 3 schematically illustrates a way for estimating the wireless channels between a user equipment and multiple HAPs. As illustrated in FIG. 3 each HAP (five shown in FIG. 3) 100 wirelessly communicates with a user equipment via a respective wireless communication channel $300_{1-5}$. Each HAP transmits a predetermined reference signal as a beacon signal (shown schematically via a common line 310) which is individually detectable by the user equipment in question. The user equipment measures the received signal strength and relative time difference of arrival of each reference signal. Optionally the user equipment measures a time of arrival for each reference signal. Optionally the user equipment relays received packets of each reference signal. Aptly the reference signal comprises a reference sequence. The user equipment sends back a respective measurement report via an existing communication link (provided in a way described in more detail below) indicating propagation characteristics for every separate reference signal it receives from the HAPs. The measurement report thus includes information which can be used to generate an estimated channel matrix. A channel matrix can be constructed representing characteristics for all the wireless communication channels between every HAP and every user equipment. Optionally each HAP-user equipment pair has a complex number associated with it. The amplitude of the complex number represents the respective channel amplitude gain (square root of the power gain). The angle in the complex plane represents the phase shift of the channel. It will be appreciated that whilst the channel matrix can be represented by multiple complex numbers other mathematical techniques can be utilised to store indicators associated with channel amplitude gain and phase shift associated with any single channel for the multiple channels between user equipment and aerial vehicles in a communication network. Via the estimation scheme illustrated in FIG. 3 a user equipment only needs send a single report to any one HAP with a whole list of other HAP reference signal times. The user equipment does not need to communication with every HAP separately. A user equipment is registered and communicating via a single cell be it a wide coverage cell or a P-cell. It will be appreciated that a possible alternative is co-operative multi-point where a single user might be served by several cells at once.

FIG. 4 schematically illustrates an alternative way for estimating the wireless channel between a user equipment and multiple HAPs. As illustrated in FIG. 4 each HAP (five shown in FIG. 4) 100 wirelessly communicates via a respective communication channel and a user equipment is instructed, either via a single channel wireless communication link from selected HAP, or subsequent to establishing a multi-channel wireless communication link via co-operative beamforming via that link, to transmit a predetermined reference signal. Aptly the reference signal is a sounding reference signal as standardised in Long Term Evolution (LTE) networks. This reference signal is then received wirelessly via respective channels by every individual HAP. The received data can be relayed or data extracted from the received signal is relayed to a processing element in the HAP-Cell processing centre which can then estimate the uplink channel attenuation and phase shift. An advantage of this method over the downlink estimation method described with respect to FIG. 3 is that its accuracy depends upon the implementation of the HAP-Cell system and is not limited by the measurement accuracy of standard mobile user equipment. Aptly content associated with the received reference signal is not extracted. Only relative amplitude and phase associated with a transmitted data packet forming part of a reference signal is utilised. A whole packet may be relayed to a ground station in a synchronised way or amplitude and time of arrival of a received signal can be measured at each HAP and the measured values are relayed. Time reference across different HAPs can be synchronised to help provide accurate signalling. Synchronisation can be achieved via one or more of reference to GPS time reference, atomic clocks, synchronisation signals from ground stations (which are aware of propagation delay differences to every HAP) or the like.

The processing element of the communication network determines at least one propagation characteristic for each respective wireless communication channel. Aptly the at least one propagation characteristic comprises an estimated gain and an estimated phase shift of the wireless communication channel. Optionally each user equipment is arranged to transmit a reference signal from the user equipment to each of the aerial vehicles. The transmitted reference signal may comprise a standardised network reference signal. Aptly the standardised network reference signal can comprise an LTE sounding reference signal. Alternatively each aerial vehicle can be arranged to transmit a reference signal from the aerial vehicle to a user equipment.

FIG. 5 helps illustrate downlink channel estimation after a P-cell has earlier been established. This corresponds to the downlink channel estimation scheme illustrated in FIG. 3. FIG. 5 illustrates two nodes in a communication network and the signaling and actions therebetween. A first node represents the user equipment node 500 and the further node 510 represents the HAP-Cell system which schematically is associated with a constellation of HAPs 200, the ground station 255 and HAP-Cell processing centre 265 shown in FIG. 2. Via a first step S 515 the HAP-Cell processing centre instructs the user equipment to measure time difference of arrival (TDoA) of beacon signals sent from a plurality of HAPs. Each of those HAPs is associated with the narrow cell or alternatively may not be contributing to that cell. At step S 520 the HAP-Cell system including the HAPs transmit beacon signals in the vicinity of the user equipment. The user equipment determines amplitude and time difference of arrival of any detected beacon signals from the various HAPs and from this sends back a measurement report via step S 530 the measurement report can optionally include amplitude/phase information determined at the user equipment itself or may optionally include information in the form of raw data that can subsequently be used at the node 510 associated with the HAP-Cell system. Responsive to the measurement report at step S 540 the downlink channel characteristics can be estimated with the estimated values being used to help create a channel matrix. An uplink channel can be estimated responsive to the estimated downlink channel. This is illustrated by step S 545. The uplink channel can be estimated by assuming that the signal attenuation and phase shift between user equipment and HAP is identical on both uplink and downlink. The channel estimation steps are repeatedly estimated via an iteration step S 550 which may occur at repeated intervals of between ever 100 milliseconds to every 1 second.

FIG. 6 illustrates channel estimation after a P-cell has earlier been established using uplink reference signals. FIG. 6 illustrates the exchange of signals between a node 500 in the communication network associated with user equipment and a node 510 in the communication network associated with a HAP-Cell system. This latter node 510 includes the aerial vehicles and ground station and HAP-Cell processing centre 265 illustrated in FIG. 2.

At step S 615 the HAP-Cell system is shown to instruct a user equipment to transmit uplink reference signals (URS) at regular intervals. These instructions are duly received at the user equipment node 500 which then begins to transmit URS at step S 625. At step S 630 the HAP-Cell system estimates uplink channel characteristics based on amplitude and phase difference of URS received at multiple HAPs. Thereafter, illustrated via step S 640, the downlink channel can be estimated based on an uplink channel estimate. The downlink channel is estimated by assuming that the signal attenuation and phase shift between the user equipment and HAP is identical on both uplink and downlink. FIG. 6 helps illustrates how the transmission of URS and uplink and downlink channel estimation is repeated iteratively at intervals of between 10 milliseconds and 1 second. Because a burden of processing the reference signal is at the HAP-Cell system side rather than in a conventional user equipment (smartphone etc.) iterations can be more frequent. Intervals of 1 ms or more can be used. This iteration is illustrated in FIG. 6 via step S 650.

A purpose of the channel estimation process is to construct a channel matrix at least for the wireless communication channels between every HAP and every user equipment. A structure for a channel matrix 700 is shown in FIG. 7. Every HAP-user equipment pair has a channel coefficient 710 associated with it. This coefficient is a complex number whose amplitude represents the respective channel gain and whose phase represents the respective channel phase shift. In this way, the received signal at every user equipment can be calculated using the following equation:

$$y = Hx \qquad (1)$$

where H is a channel matrix, x is a column vector of transmitted signals from every HAP, and y is a column vector of received signals at every UE. The received signal power for every user equipment from the given transmit signal vector can be calculated by taking the square of the amplitude of the received signal vector as follows:

$$P_{Rx} = |y|^2 \qquad (2)$$

In the case of the downlink, the task of the function is to use the estimated version of the channel matrix H to compose the transmit vector x, such that the wanted signals are successfully reconstructed at their respective user equipment receiver locations. A matrix W can then be derived, of the form shown in FIG. 8, to transform the signals required to be transmitted to every user equipment into the transmit signal for every HAP such that the original signals are then reconstructed at the user equipment receivers.

The composition of the transmit signal vector using the matrix can be expressed as follows:

$$x = W\sqrt{Q}s \qquad (3)$$

where W is the matrix 800 of the form shown in FIG. 8, Q is a diagonal power allocation matrix, and s is a column vector of transmit symbols for every user equipment. In this way every column in the $W\sqrt{Q}$ matrix indicates the amplitude and phase shift of the signal at every HAP required to communicate with a particular single user equipment receiver.

In the case of uplink (equalisation), x is the transmit vector of signals from all user equipment and y is the vector of received signals at every HAP. Consequently the dimensions of the channel matrix H and the weight matrix W are inverted for mathematical compatibility. The job of the equalisation algorithm is then to recover the transmitted signals per user given the received signals at every HAP as follows:

$$x_{recovered} = Wy \qquad (4)$$

If the channel matrix H can be estimated by the HAP-Cell system, it can be used to derive the weights for different approaches. For example, an approach that can be used and that aims to maximise the received power is Maximum Ratio Combining (MRC). Strictly MRC refers to combining signals from multiple HAPs on the uplink: the equivalent applied to the downlink can be referred to as Maximum Ratio Transmission (MRT). However, in this description the term MRC is used for both:

$$W_{MRC} = kH^H \qquad (5)$$

where $H^H$ is the Hermitian (i.e. conjugate transpose) of the channel matrix H, and k is a single normalisation factor for the entire matrix.

However, adopting the complex channel matrix approach described means other methods with interference cancellation properties, can be used. For example, a weight matrix for a zero forcing approach is given below:

$$W_{ZF} = kH^H(HH^H)^{-1} \qquad (6)$$

In this way, the weight matrix $W_{ZF}$ is a scaled pseudo-inverse of the channel matrix H. Given, perfect channel estimation and a smaller number of user equipment than HAPs, this approach can achieve perfect or near perfect interference cancellation, i.e. the signal arriving at every UE is free of interference from concurrent signals to every other user equipment.

An alternative to using zero forcing and that achieves a good balance between maximising the received power and cancelling interference from other transmissions is minimum mean square error (MMSE). The weight derivation formula for MMSE is given below:

$$W_{MMSE} = kH^H(HH^H + \sigma^2 I)^{-1} \qquad (7)$$

where I is the identity matrix and $a^2$ is the noise variance term calculated as follows:

$$\sigma^2 = \frac{P_{Noise}}{P_{Tx}} \qquad (8)$$

where, $P_{Tx}$ is transmit power (necessary for normalisation in the downlink precoding case to optimise SNR at the remote receivers, this factor is not applicable in the uplink equalisation case because there the HAPs are the receivers); and $P_{Noise}$ is the noise power at the receiver (this includes external interference from other patches/cells, or in general from all other transmissions not included in the given H matrix).

This noise enhancement term helps provide adaptable trade-off between interference cancellation and received signal power. In high SNR scenarios, it is negligible and MMSE behaves as zero forcing; however, in low SNR scenarios, this noise variance term makes MMSE operate in a power maximizing mode.

The channel estimation unit 295 in the ground based processing centre 265 includes a processing element 299 for determining at least one propagation characteristic for each respective wireless communication channel. A data store 298 in the channel estimation unit 295 stores a channel matrix for wireless communication channels between every aerial vehicle and every user equipment. The channel matrix comprises a complex number for each wireless communication channel for each aerial vehicle-user equipment pair.

Estimating the wireless communication channel between every HAP and every user equipment enables further beamforming methods with interference cancellation to be deployed among user equipment in close proximity to one another. FIG. 7 helps illustrate a structure of a beamforming channel matrix that can be utilised. In the downlink case, a complex matrix 700 such as this can be used to transform transmit signals to every user equipment into the actual transmit signals issued from every HAP. In this way wanted signals are reconstructed at every individual user equipment and unwanted interference is cancelled out. In the uplink case a complex weight matrix 800 (as shown in FIG. 8) can be used to reconstruct signals received from every user equipment given the mixture of the signals received at every HAP. In this way taking the inverse or pseudo inverse of the channel matrix such as that depicted in FIG. 7 and using the result as a beamforming weight matrix may be referred to as zero forcing. If a number of user equipment is lower than a number of HAPs and if the channel is estimated accurately then it is theoretically possible for all interference to be cancelled out. Thus interference free concurrent data communication can be allowed with all user equipment. I.e. spatial multiplexing from HAPs.

Certain embodiments of the present invention thus enable beamforming methods based on complex channel estimation to achieve network capacity enhancements relative to prior art techniques by enabling high data rate concurrent communication with multiple user equipment. A number of user equipment that can be supported by these spatial multiplexing methods can be limited by a number of HAPs in a serving constellation. For example if there are 50 HAPs used for co-operative interplatform beamforming, a number of user equipment that can be independently concurrently supported with interference cancellation is theoretically less than 50.

FIG. 9 helps illustrate a technique for grouping user equipment into scheduling clusters to help overcome this limitation. Thus, certain embodiments of the present invention overcome this limitation and maintain network throughput enhancement achieved by the HAP based spatial multiplexing method by using a user time-frequency resource scheduling methodology. This methodology is optionally applied where a number of user equipment exceeds a predetermined or optimal number of concurrent data transmissions. FIG. 9 illustrates an example where there are four user equipment 910, 920, 930, 940 requiring data communication but in a hypothetical scenario when an optimal number of interference-free concurrent transmissions is three. In this instance the user equipment can be grouped by adopting airtime scheduling clusters. An optimal number of concurrent transmissions can be defined as a maximum number of users in a beamforming cluster, for which effective interference cancellation is achievable. This is such that the total throughput of all concurrent transmissions is at its maximum. This number will vary, and will typically be less than the number of HAPs involved in beamforming. It will be adjusted dynamically by the HAP-Cell processing centre based on the number and position of the HAPs, the signal-to-noise ration and the measured channel characteristics of every user equipment.

For example, 25% of airtime can be allocated to a first scheduling cluster for users of three user equipment 910, 920 and 930. 25% of airtime can be allocated to a second scheduling cluster for users of another three user equipment of 920, 930 and 940. 25% of airtime can be allocated to a third scheduling cluster for users of a still further three user equipment 910, 930 and 940. 25% of airtime can be allocated to a fourth scheduling cluster for users of a remaining three user equipment 910, 920 and 940.

In this way every user equipment is allocated a total of 75% of the bandwidth resources with three out of four users always communicating simultaneously using the HAP based beamforming methods. It will be appreciated that this grouping methodology can be scaled up where every user will optimally be allocated a proportion of airtime resource:

$$\text{Proportion of airtime} = \frac{\text{Optimal number of concurrent transmissions}}{\text{Total number of users}} \quad (9)$$

FIG. 10 illustrates an alternative to the clustering methodology illustrated in FIG. 9. In contrast with the scenario described with respect to FIG. 9 where the number of simultaneously served users exceeded a spatial multiplexing capacity of a HAP-Cell system it will be appreciated that there are situations where a number of user equipment is lower than a predetermined number of concurrent transmissions. For example, this may be the case in sparsely populated rural areas. For these scenarios certain other embodiments of the present invention make use of the inclusion of other radio transceivers/transmitters in the channel estimation and beamforming methods previously described. These further receivers/transmitters are accounted for the sole purpose of interference cancellation. That is to say data is not communicated with these further devices.

FIG. 10 helps depict an example of this approach. As shown only two users each with a respective user equipment 1010, 1020 communicate with the constellation of HAPs. In this hypothetical scenario this is below a spatial multiplexing capacity of the HAP-Cell system. As a result a corresponding beamforming weight matrix can be augmented to include entries for one or more further wireless devices. One further wireless device 1030 is illustrated in FIG. 10. This further wireless device 830 may be representative of a user with a user equipment in a different cell or on a different access network operating in the same spectrum. In this way the interference from/to the further wireless device will be cancelled out by the beamforming process. This helps improve quality of a wireless communication link between the constellation of HAPs and the user equipment 1010, 1020 as well as helping improve communication quality at the further additional device 1030.

Aptly when a total number of user equipment exceeds a predetermined number associated with a number of deployed HAPs, each user equipment is allocated a less than 100% share of a basic airtime bandwidth resource of a respective wireless communication link associated with that user equipment and the plurality of aerial vehicles. This technique for sharing a total basic airtime bandwidth resource by grouping user equipment into scheduling clusters helps a predetermined number of HAPs provide wireless communication to a relatively large number of user equipment. Aptly the processing element of the channel estimation unit is arranged for selectively determining at least one propagation characteristic for each respective further wireless communication channel between further wireless devices and each aerial vehicle of a plurality of aerial vehicles served by the processing centre 265. That is to say when the processing centre handles communication with user equipment via a constellation of aerial vehicles further wireless devices which may be wireless devices operating on another network have propagation characteristics determined for those further wireless communication channels. A signal transmitted by a third party device can be detected (but not decoded) at individual HAPs and time of arrival and signal strength can be compared. This is equivalent to uplink channel estimation. As an alternative approximating a channel based on a geographical location can be utilised. This will be a best effort interference cancellation technique. A still further alternative would involve an official agreement between operators to allow internetwork reference signalling. A data store 298 in the channel estimation unit 295 stores a weight matrix for beamforming when providing a wireless communication link between a user equipment and a plurality of aerial vehicles that includes weights determined responsive to the determined propagation characteristic of each further wireless communication channel.

Certain embodiments of the present invention thus provide a process for estimating a wireless channel attenuation and phase shift between multiple user devices and multiple aerial antennas mounted on moving HAPs. This channel information is used to provide mobile coverage to the user devices. The process can be used to provide mobile coverage to multiple user devices in the same frequency-time spectrum optionally utilising equalisation and precoding techniques. User scheduling can optionally be utilised where users are divided into overlapping clusters of concurrent transmissions and every cluster of user is assigned a proportion of frequency-time resources. Certain embodiments of the present invention augment concurrent user communication clusters solely for the purpose of interference cancellation and not for data communication.

Certain embodiments of the present invention relate to the processes and required apparatus for providing mobile coverage to multiple user devices using two or more aerial antennas mounted on HAPs. A precise channel estimation procedure can be utilised that detects the attenuation and phase shift between every user device and every aerial antenna on a HAP. Simultaneous communication can then occur with multiple user devices using the estimated channel information.

Certain embodiments have been described which estimate channels between user equipment and HAPs. Reference has been made to determining an amplitude and phase for each channel.

This can be determined in various ways according to certain embodiments of the present invention. A way is for a user equipment to measure time difference of arrival of reference signals (in time units, e.g. increments of a special basic LTE time unit) and send them back. It will be appreciated that for other implementations the same information may be expressed differently. That is to say different time units or expressed as phase. The phase for a complex number can be derived from the delay according to the equation:

$$\theta = -2\pi f(\tau - \tau_0) \quad (10)$$

Where $\theta$ is the phase in radians, f is the carrier frequency in Hz, and $(\tau - \tau_0)$ is the measured time difference of arrival of a reference signal in seconds, relative to time $\tau_0$, e.g. the arrival time of the first received reference signal.

FIG. 11 is a view of certain nodes in the communication network 296. A first node 500 is provided by the user equipment in the communication network 296. A single user equipment is illustrated in FIG. 11. A further node 510 is the HAP-Cell system which includes the cells generated by the constellation of HAPs 200, the HAPs themselves and the HAP-Cell processing centre 265. A further node 1100 represents the core network which is connectable to an internet 1110 such as the World Wide Web or the like. The core network 1100 includes a mobility management entity (MME) 1120 which communicates with the processing centre via control plane data paths. The core network 1100 also includes a serving gateway (S-GW) 1130 which communicates with the processing centre 265 of the HAP-Cell system via a user plane connection. The core network likewise also includes a packet data network gateway (PDN-GW) 1140 which communicates with the serving gateway 1130 and the internet 1110. FIG. 11 thus helps demonstrate the control plane and user plane connections between different entities in a cellular network. Control signalling between an access network and core network is performed via the mobility management entity 1120. Thus centralised control of effective base stations is controlled via the mobility management entity. This entity also helps ensure the connectivity of the virtual base stations to the internet by controlling user data paths from a given effective base station to a particular serving gateway 1130 which in turn is connected to a particular packet data network gateway 1140.

FIG. 11 thus helps provide a top level illustration of a mobile network that involves a constellation 200 of high altitude platforms that create cells on the ground via highly directional antennas mounted on them. The constellation 200 of HAPs can behave as an effective set of remote radio heads (RRHs). These perform beamforming and transmit/receive wireless signals to/from user equipment in the communication network. A processing centre 265 controls operation of the HAPs i.e. sends beamforming instructions and relays cellular network signals that take place between user the equipments and the HAPs. The processing centre 265 also helps associate virtual base stations with the beams created by the HAPs. Thus making the HAP-Cell system appear like a conventional cellular access network as far as standard user equipment is concerned. It is to be noted that in order to help integrate with other conventional cellular architecture the HAP-Cell system can optionally be configured to appear to the core network 1100 like a standard cellular access network. To this end the HAP-Cell processing centre has a control plane interface with the mobility management entity 1120 and a user data channel to the serving gateway 1130. Virtual base station base band units maintained at the processing centre 265 will thus have connectivity with an operator's core network and therefore with the rest of the internet 1110.

FIG. 12 helps illustrate how an initial user acquisition can occur using downlink channel estimation via a single HAP wide cell. That is to say FIG. 12 helps illustrate how user equipment can acquire a communication link to a core network first using a wide cell coverage area. This is provided by a respective single channel wireless communication link. User acquisition via a wide cell coverage area initially is advantageous since user acquisition via a narrow cell formed by a multi-channel wireless communication link makes it otherwise difficult to locate user equipment in an initial phase. FIG. 12 helps illustrate a first phase 1205 referred to as user registration. FIG. 12 helps illustrate a second phase 1210 referred to as initial channel estimation via a single HAP wide cell. FIG. 12 helps illustrate a third phase 1215 in which a handover step occurs from a single wide cell provided by a single HAP to a P-cell provided by multiple HAPs.

In the first phase 1205 a user equipment receives beacon signals from the various HAPs in a relevant geographical location. Via an association request step S 1220 the user equipment makes an association request via the strongest wide coverage area cell associated with the HAP having the strongest beacon signals. Via an authentication step S 1225 user equipment authentication and registration signalling occurs between the HAP-Cell system node 510 and the core network node 1100. After this the HAP-Cell system node 510 sends an effective association response via the wide coverage cell selected by the user equipment. This association response is illustrated by a response step S 1230. This is followed by an instruction from the HAP-Cell system node 510 to instruct the user equipment to measure time difference of arrival (TDoA) of beacon signals from other cells. This instruction is illustrated by an instruction step S 1235. This step marks the start of the second phase of the user acquisition process. Via a report step S 1240 the user equipment sends back a measurement report.

In response to the measurement report provided by the user equipment at step S 1240 the HAP-Cell system node 510 can determine the user equipment's position based on the TDoA of beacons from other cells. This is illustrated by a position determining step S 1245. Thus FIG. 12 helps show a way of determining a user location that can make use of certain standardised dard measurements performed by user equipment. Observed time difference of arrival measurements can be utilised. A user equipment is initially connected to a wide coverage cell e.g. created by an aerial antenna on a single HAP using a standard cell associated procedure. In order to help boost a range of the wide coverage, low gain cell beacon signal if necessary, the HAP can utilise a low band width channel e.g. a 1.4 MHz or 3 MHz LTE channel. Once a user equipment is acquired by a wide coverage cell it can be instructed to measure the OTDoA of beacon signals from other HAPs. The other HAPs in the constellation will direct their beams towards the same cell area and transmit beacons with unique physical cell ID numbers detectable by the user equipment. When the user equipment sends back the OTDoA measurement report back to a serving effective base station i.e. the wide coverage cell, the HAP-Cell processing centre will be able to see these measurements in conjunction with its accurate knowledge of the HAP locations. This combined information can be utilised to determine a user equipment location.

Accuracy of the OTDoA measurement based approach can be limited by the quantisation error of standard user equipment devices. For example in the case of LTE the step size is approximately 32 nanoseconds i.e. a basic LTE time unit equal to 1/(15000×2048) seconds. Nevertheless according to certain embodiments of the present invention this approach can be used as a first step in determining the user equipment location to within 1 to 10 m of accuracy.

Subsequent to the determination of a user equipment position at step S 1245 that location is sent to the core network illustrated via a storage control step S 1250 where a respective location is stored for each user equipment. Subsequent to the location of the user equipment being accurately determined it is possible to use multiple HAPs to create a narrow cooperative beam at the detected user equipment location. This is illustrated by a beam creation step S 1255 in FIG. 12 and begins the start of the third phase 1215 in the user acquisition process. This new narrow beam is registered as a cell via a registration step S 1260. Subsequent to the registration of this narrow beam as providing an effective narrow cell and thus an effective base station, a handover command/request can be exchanged between the user equipment and the HAP-Cell system. This is illustrated by a handover command step S 1265. Association and synchronisation thereafter takes place between the user equipment and the P-cell created via cooperative beamforming and illustrated by an association and synchronisation step S 1270 in FIG. 12. After association and synchronisation with the user equipment and the P-cell a request is transferred from the HAP-Cell system node 510 to the core network node 1100 to request user plane path switching for that particular user equipment. This is illustrated by request step S 1275 in FIG. 12. An update step S 1280 illustrates the update of paths for that particular user equipment subsequent to the request for a user plane path switch. This results in a path switch acknowledgement being sent as part of an acknowledgment step S 1285 from the core network to the cell processing centre in the HAP-Cell system which results in the user equipment being in communication with the core network via the multi-channel wireless communication link associated with the P-cell.

FIG. 13 illustrates an alternative to user acquisition using an uplink channel estimation via an initial single HAP wide cell. The user acquisition process includes three phases. A first phase 1305 is a user registration phase. A second phase 1310 is an initial channel estimation via single HAP wide cell phase. A third phase 1315 is a handover phase in which a user handover occurs from the wide coverage cell provided by a single HAP to a narrow coverage cell provided via a multi-channel communication link from multiple HAPs.

An association request step S 1320 illustrates an association request being sent from a user equipment to the HAP-Cell system. This is in response to beacon signals being transmitted from the HAPs in a relevant geographical area. The association request is made to associate with a wide coverage area cell provided by the HAP which provides the strongest beacon signal. Subsequent to this request an authentication step S 1325 occurs whereby user equipment authentication and registration takes place between the HAP-Cell system and the core network. Thereafter an association response is sent as a response step S 1330 via the wide coverage cell originally selected by the user equipment. After this association response is sent the HAP-Cell system instructs the user equipment to transmit a wireless signal. Aptly this is an uplink reference signal (URS). This is illustrated by an instruction step S 1335. This is the start of the second phase of the user acquisition process. Next the user equipment transmits URS via a transmit step S 1340. Responsive to the received URS signals, as illustrated by step S 1345 in FIG. 13, it is possible to determine a user equipment's position based on the phase difference or URS received at multiple HAPs. FIG. 13 thus illustrates an alternative approach to the OTDoA positioning method for accurately determining a location of user equipment. In this process illustrated in FIG. 13 the user equipment position is determined by the HAP rather than the user equipment. The wide coverage area cell to which the user equipment is initially connected instructs the user equipment to transmit uplink reference signals (URS). Aptly this can be a sounding reference signal (SRS). The user equipment is thus told to transmit sounding signals by a base station to begin a P-cell user acquisition. Optionally a wide cell or an array of P-cells can be utilised to look for the user equipment. Aptly the URS is used for uplink channel estimations. In this way aerial antennas mounted on HAPs work as receivers measuring the phase difference of the URS arriving from the user equipment. An advantage of this approach is that it is not limited by any quantisation error imposed by a standard user equipment device but rather by an accuracy of measurements which is determined by the proprietary nature of the HAP-Cell system. Using this technique a user equipment device location can be determined to within 0.5 m accuracy. Even greater degrees of accuracy can be achieved according to certain embodiments of the present invention.

Once the location of the user equipment is determined the HAP-Cell system provides this location to the core network and the user equipment location is stored in the core network. This is illustrated by a storage control step S 1350 in FIG. 13. Once the user equipment location is known it is possible to utilise multiple HAPs to create a narrow cooperative beam at the detected user equipment location. This is illustrated by a beam creation step S 1355 in FIG. 13 which is the initial step in the third phase of the user acquisition process. Thereafter the narrow beam is registered as a cell via a registration request illustrated by a registration step S 1360. A handover command/request is then carried out via the original wide coverage cell to which the user equipment is at that stage still connected. This is illustrated by a handover command step S 1365 in FIG. 13. Thereafter association and synchronisation occurs with the new narrow beam P-cell. This is illustrated by step S 1370 in FIG. 13. Thereafter a user plane path switch is requested for the user equipment from the HAP-Cell system to the core network. This is illustrated by step S 1375. After this, paths for the user equipment are updated. This is illustrated by step S 1380. Thereafter a path switch acknowledgment is sent from the core network to the HAP-Cell system via step S 1385 and communication occurs between the user equipment and the core network via a multi-channel communication link provided by a constellation of HAPs. Thus after creating an ultra-narrow cooperative beam at a detected user equipment location the HAP-Cell processing centre can register the P-cell as a new cell. I.e. the resulting newly spawned virtual base station can be associated with the core network. Once the new ultra-narrow beam is registered as a standard cell the user equipment can start receiving beacon signals with its physical cell ID at a significantly higher power than its currently serving wide coverage area. This triggers the user equipment to associate with the narrow cell by appearing as the best cell in terms of signal strength. Afterwards, depending upon a user equipment state (i.e. idle or actively uploading/downloading data), either the user equipment will send a handover request to the wide area cell base station or the base station will send a handover command to the user equipment. Once a user equipment is associated and synchronised with its cooperative inter-HAP beam P-cell, the HAP-Cell processing centre will use its interface with the core network to update the user plane data paths. This helps make sure the user equipment and the P-cell base station are connected to appropriate gateways and thus have connectivity to the internet. FIG. 14 illustrates certain elements of the communication network 296 shown in FIG. 2 in more detail in terms of their use during the acquisition process. That is to say FIG. 14 illustrates user acquisition apparatus. A constellation 200 of HAPs can create a multi-channel wireless communication link to a user equipment thus providing a P-cell at the location of the user equipment. One or more of the HAPs in the constellation likewise provides a single channel wireless communication link which provides a wide coverage cell at a region which includes where the user equipment is located. The constellation of HAPs communicates to the ground station 255 which is connected to the HAP-Cell processing centre 265. FIG. 14 illustrates certain elements in the HAP-Cell processing centre such as the beamforming controller 275. Also illustrated is a virtual wide coverage cell controller 1400 and a virtual P-cell controller 1410. The beamforming controller 275 and wide and narrow cell controllers 1400, 1410 communicate with a user acquisition controller 1420. The user acquisition controller 1420 is connected to the beamforming controller 275 and provides beamforming instructions to the beamforming controller which then communicates via a control interface and a connection 270 to the ground station or ground stations and from there to the constellation of HAPs via a HAP-Cell control interface. This is associated with a cellular fronthaul interface.

The user acquisition controller 1420 likewise exchanges control signals between the virtual wide coverage cells controller 1400 which determines operation of virtual wide coverage cells and the virtual P-cells controller 1410 which determines operation of virtual P-cells. Control signals are exchanged between associated connections as are handover instructions. The virtual wide coverage cell controller 1400 and virtual P-cell controller 1410 communicate with the ground station/s 225 via a cellular fronthaul interface and a connection 270.

Thus certain embodiments of the present invention provide a method for connecting a mobile user equipment to a core network. The method can include the steps of providing a single channel communication link between a user equipment and one of a plurality of aerial vehicles. Via the plurality of aerial vehicles a multi-channel communication link is provided with the user equipment. Thereafter, via a handover step, communication between the user equipment and the core network is transferred from communication via the single channel communication link to communication via the multi-channel communication link. The step of providing a single channel communication link includes forming a beam, from a directional antenna of an aerial vehicle, towards the ground that illuminates a first cell coverage area this is a so-called wide cell coverage area. The cell coverage area of a wide coverage cell has a footprint with a width of greater than 500 m.

The step of providing a multi-channel communication link comprises cooperatively forming a beam, via respective directional antennas of the plurality of aerial vehicles, towards the ground that illuminates a further cell coverage area. This further cell coverage area is much narrower and may be referred to as a P-cell. The further cell coverage area has a footprint with a width of less than 1 m. Optionally the footprint has a width of less than 0.5 m. In this sense a footprint of a cell coverage area comprises a region where a wireless signal strength is strong enough that a user equipment located within the cell coverage area can associate with the core network via an associated single channel communication link or a multi-channel communication link. The method of user acquisition includes the step of determining a location of the user equipment responsive to a wireless signal exchanged via a single channel wireless communication link. Communication between the user equipment and a core network is thereafter transferred selectively responsive to the location of the user equipment being determined. Various optional techniques can be utilised for determining the location. One of these techniques utilises measurement of OTDoA of beacon signals. Another option is to instruct user equipment to transmit an uplink reference signal such as a sounding reference signal. Other options could of course be utilised according to certain embodiments of the present invention.

FIGS. 15 and 16 illustrate user equipment tracking subsequent to user acquisition of user equipment with a narrow P-cell provided by a multi-channel wireless communication link. As the user equipment moves, which may be likely if the user equipment is a mobile device such as a smart phone, knowledge of a location of the user equipment is useful to help during the multi-channel beamforming process. Likewise the location is useful in determining if a multi-channel wireless communication link is likely to be dropped. As a user equipment moves the determination of its location will enable the HAP-Cell processing centre to dynamically adjust amplitude and phase weights for each HAP involved in any cooperative beamforming.

FIG. 15 illustrates a first approach that can be employed to track a user equipment location. This can make use of certain conventional cellular signalling schemes but assumes that the user equipment is already connected to a P-cell (as above described). As illustrated in FIG. 15 several additional P-cells can be created to surround a serving P-cell beam. Each of these additional P-cells transmit beacons with its own unique cell ID. Such beacons with cell IDs are used by cells. The user equipment is then instructed by its serving P-cell to report back the power level of the cell beacons it receives. FIG. 15 thus illustrates a constellation 200 of HAPs which create multiple multi-channel wireless communication links via cooperative beamforming techniques. Five multi-channel wireless communication links $1500_{1-5}$ are shown in FIG. 15. Each of these multi-channel wireless communication links provides a respective P-cell $1510_{1-5}$. One P-cell $1510_3$ is shown focused on the specific location where a user equipment is determined to be located. This is the serving cell. The four further P-cells are directed to locations proximate and to some extent surrounding the serving P-cell. It will be appreciated that two, three, four, five or more P-cells can be utilised at locations close to the servicing P-cell. The P-cells may overlap to some extent or optionally may not overlap. Aptly the P-cells that are auxiliary or extra P-cells overlap by 10% or more with each other and/or the serving P-cell.

Beacon signals are transmitted (illustrated by arrow 1520 in FIG. 15) on the downlink to the user equipment which then sends a measurement report 1530. The beacons with cell IDs are used by cells. The user equipment is instructed by its serving P-cell to report back the power levels of the cell beacons it receives. Given this information the processing centre can estimate in which direction the serving P-cell beam has to be moved to track the user. E.g. in the direction of the strongest surrounding P-cell beacon.

FIG. 16 illustrates an alternative technique by which it is possible to track movement of user equipment. This helps a processing centre estimate in which direction a serving P-cell beam has to be moved to keep track with the user. This second approach is based on uplink reference signalling (URS). A serving P-cell indicated as being generated by a respective multi-channel wireless communication link 1600 generates an associated P-cell 1610 at a location of the user equipment. The serving P-cell requests the user equipment to transmit frequent URS. The instruction is illustrated by an arrow 1620 in FIG. 16. In response the user equipment transmits the uplink reference signals illustrated by a respective arrow 1630 in FIG. 16. Which are then received by every HAP in the constellation 200 individually. The received signals can be subsequently analysed by the processing centre to determine the user equipment location. For example, the user equipment can be requested to transmit URS as frequently as every 2 ms. This will be sufficient to track highly mobile user equipment e.g. those travelling in cars or even via high speed trains.

FIG. 17 illustrates a situation which may arise in a HAP-Cell system with cooperative interplatform beamforming. Such a situation, or risk, is a loss of connectivity with the user equipment with a narrow P-cell. This may occur when the user equipment walks into a building thus potentially introducing a significant change in the radio propagation paths to the HAPs. Alternatively this may occur for a very fast moving user equipment in certain geographical territories or the like. For such cases certain embodiments of the present invention can implement an intelligent detection mechanism which uses user equipment location tracking information and other control signals to help predict when such a loss of P-cell connectivity is about to occur. When this is determined a handover process can be initiated from the relatively narrow P-cell back to a wider wide coverage cell associated with a single channel wireless communication link. In such a way it can be possible to maintain a user equipment's continuous connection to a network. This can be utilised in situations when a dedicated P-cell becomes out of range with user equipment. It will be appreciated that optionally certain embodiments of the present invention can thereafter carry out a further handover switch from the wide coverage cell to a narrow coverage cell when it is determined that a user equipment location and movement is such that a P-cell can be utilised.

FIG. 17 illustrates three respective nodes of a communication network. A first node 500 is associated with user equipment. A further intermediate node 510 is associated with a HAP-Cell system. A third node 1100 is associated with a core network of the communication network. As illustrated in FIG. 17 via a prediction step S 1700 the HAP-Cell system predicts that the user equipment is likely to lose connectivity with a serving P-cell. This prediction can occur via different techniques according to certain embodiments of the present invention. If it is determined that the user equipment is moving in a manner likely to lose connectivity a handover command step S 1710 occurs via a command being passed from the HAP-Cell system node 510 to the user equipment. Thereafter an association and synchronisation step S 1720 sees association and synchronisation signals being exchanged with a wide coverage cell. Subsequently a request step S 1730 sees a request for a user plane path switch for the particular user equipment being sent to the core network. An update step S 1740 occurs within the core network whereby the paths for communication etc for the user equipment are updated. Once this has been carried out a path switch acknowledgment is sent from the core network to the HAP-Cell system as indicated by the acknowledgement sending step S 1750 in FIG. 17.

Certain embodiments of the present invention thus provide a method for maintaining a connection of user equipment which is mobile to a core network. The method includes the steps of providing a multi-channel communication link between a user equipment at a first location and a plurality of aerial vehicles. Next a determination step determines that the user equipment is moving whereby a loss of connectivity via the multi-channel communication link may occur. Subsequently, via a handover step, communication between the user equipment and the core network can be transferred from communication via the multi-channel communication link associated with the initial serving P-cell to communication via a single channel communication link provided by a respective single aerial vehicle. The single channel communication link can be provided by forming a beam, from a directional antenna of a respective aerial vehicle, towards the ground that illuminates a first cell coverage area. The first cell coverage area has a footprint with a width of greater than 500 m. The step of providing the multi-channel communication link comprises cooperatively forming a beam, via respective directional antennas of the plurality of aerial vehicles, towards the ground that illuminates a further cell coverage area. The further cell coverage area has a footprint with a width of less than 1 m and optionally less than 0.5 m.

Determining that a user equipment is moving can be carried out in different ways. For example, the step of determining that the user equipment is moving can comprise providing additional P-cells geographically proximate to a cell coverage area provided by a serving P-cell and transmitting respective beacon signals via those additional wireless communication links. Determining motion can occur responsive to a power level of beacon signals received at the user equipment from the additional cells. Determining that connectivity is likely to be lost can be determined in various ways such as by determining that a speed of movement exceeds a predetermined threshold value. Alternatively, with knowledge of a particular geographical location which can be stored separately a determination can be made that a user equipment is moving into a zone whereby loss of connectivity with a serving P-cell is likely. An alternative process for determining that user equipment is moving can include instructing a user equipment to transmit an uplink reference signal and receiving the transmitted signals at multiple points.

FIG. 18 illustrates user equipment location tracking apparatus. In particular FIG. 18 illustrates certain elements of a communication network previously described which focus on user equipment tracking. As illustrated in FIG. 18 a constellation 200 of HAPs can exchange wireless signals with a coverage area which can include multiple user equipment. The constellation 200 of HAPs is in wireless communication with one or more ground station/s 255 which communicate with the constellation of HAPs via a HAP-Cell control interface and provides an effective cellular fronthaul interface. The HAP-Cell processing centre 265 includes a channel estimation controller 295, a virtual wide coverage cell controller 1800 and a virtual P-cell controller 1810. A user tracking controller 1820 in the HAP-Cell processing 265 receives channel estimation information from the channel estimation unit 295. The user equipment tracking controller sends signalling instructions to the virtual wide coverage cell controller 1800 and signalling instructions to the virtual P-cells controller 1810. These exchange uplink/downlink control signals via the ground station/s 255.

The channel estimation unit 295 exchanges information with the ground station/s 255 via a HAP-Cell control interface. The user equipment tracking controller at the HAP-Cell processing centre stores estimated locations of all user equipment connected to the HAP-Cell system. This includes recent trajectories of their mobility. This helps enable the prediction of their location during upcoming packet transmissions. The user equipment tracking controller has an interface with the virtual cells serving the users through which it will instruct the cells to transmit required control and reference signals. This can occur at a specified frequency both on an uplink and downlink. The interface between the user equipment tracking controller and the channel estimation unit enables the user equipment tracking controller to obtain attenuation and phase difference of reference signals, received at or transmitted from multiple HAPs. This helps determine a user's location.

FIG. 19 helps illustrate an approach that can help further facilitate the HAP-Cells systems ability to avoid loss of P-cell connectivity. This can be provided to help enable the user equipment to be simultaneously connected with a wide coverage cell and, when possible or at selected times, the user equipment can also be connected to a narrow P-cell. This is a multipoint scheme where multiple cells can be used by a single user equipment simultaneously. The user equipment will communicate all data traffic via a P-cell whilst it is in reach. A minimum required control plane signal exchange occurs with a wide coverage cell. In the event of losing connectivity to the P-cell the user equipment can be instructed to redirect all of its data traffic via the wide coverage cell thus not dropping the connection.

FIG. 20 schematically illustrates an alternative way of user acquisition, prior to having a registered relationship with a user equipment and a P-cell and prior to tracking location. A HAP-Cell system creates many narrow beams and transmits respective beacon signals via those beams thus presenting each as a "standard cell". This is on the basis/hope that one or more of the beacon signals may "hit" a user equipment. Under such circumstances a user equipment in the catchment area of the generated narrow beams responds with an association request using a synchronisation sequence it receives as part of the beacon. As a result, a narrow P-cell is already provided by optimistically/blindly hitting a user equipment with it.

FIG. 20 thus illustrates three respective nodes of a communication network. A first node 500 is associated with the user equipment. A further intermediate node 510 is associated with a HAP-Cell system. A third node 1100 is associated with a core network of the communication network. As illustrated in FIG. 20 via a beacon signal transmission step S 2000 the HAP-Cell system generates a plurality of narrow beam P-cells and transmits beacon signals with respective cell IDs for each of those narrow beam P-cells. The direction in which the narrow beams are pointed is random or predetermined across a service area associated with the HAP-Cell system. Alternatively the beams are transmitted in directions predicted to be where user equipment may be located. Some of these generated narrow beams will be directed to areas where user equipment is located. For these, the user equipment will send an association request to the HAP-Cell system. The associated request is illustrated via step S 2010 in FIG. 20. Subsequent to the association request the HAP-Cell system node 510 exchanges signals with the core network node 1100 as part of an authentication and registration step S 2020. Subsequently an association response S 2030 is sent to the user equipment. Thereafter the user equipment's position is determined S 2040 based on a beam direction of the selected P-cell. This location is stored as respective user equipment location information in the core network and thereafter channel estimation can occur as per previously described.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for maintaining a connection of mobile user equipment to a core network, comprising the steps of:
providing a multi-channel wireless communication link between a user equipment at a first location and a plurality of aerial vehicles by co-operatively forming a first beam, via respective directional antennas of the plurality of aerial vehicles, towards the ground, wherein the first beam as co-operatively formed by the plurality of directional antennas illuminates a narrow cell coverage area of less than one meter for the multi-channel wireless communication link;
providing a single channel wireless communication link by forming a second beam, via a respective directional antenna of one of the plurality of aerial vehicles, towards the ground, wherein the second beam as formed by the respective directional antenna illuminates a wide cell coverage area of at least one hundred meters for the single channel wireless communication link; and
determining that the user equipment is moving, wherein movement of the user equipment may cause a loss of connectivity via the multi-channel wireless communication link, provided by the respective directional antennas of the plurality of aerial vehicles, to occur subsequently, transferring communication between the user equipment and a core network from communication via the multi-channel wireless communication link provided by the respective directional antennas of the plurality of aerial vehicles to communication via the single channel communication link provided by the respective directional antenna of a single aerial vehicle of the plurality of aerial vehicles by disabling communication with the user equipment via the multi-channel wireless communication link and enabling communication with the user equipment via the single channel wireless communication link;

subsequently, determining that movement of the user equipment is such that a narrow cell having a narrow coverage area is likely to be able to maintain a link with the user equipment; and transferring communication via the single channel wireless communication link to communication via the multi-channel wireless communication link or a further multi-channel wireless communication link that also provides a narrow cell having a narrow cell coverage area by disabling communication with the user equipment via the single channel wireless communication link and enabling communication with the user equipment via the multi-channel communication link or the further multi-channel wireless communication link to reestablish communication with the user equipment via a narrow cell having a narrow cell coverage area.

2. The method as claimed in claim 1, wherein:
the wide cell coverage area has a footprint with a width of greater than 500 metres.

3. The method as claimed in claim 1, wherein:
the narrow cell coverage area has a footprint with a width of less than 0.5 metres.

4. The method as claimed in claim 2, further comprising:
a footprint of a cell coverage area comprises a region where a wireless signal strength is strong enough that a user equipment located within the cell coverage area can associate with the core network via an associated single channel wireless communication link or a multi-channel wireless communication link, or a footprint of a cell coverage area comprises a region defined by an imaginary boundary congruent with positions where a wireless signal strength of the single channel wireless communication link or multi-channel wireless communication link respectively is at a predetermined threshold level lower than a maximum signal strength or where a carrier to noise ratio of the communication link is at a predetermined threshold in the respective first or further cell coverage area.

5. The method as claimed in claim 1, wherein the step of determining that the user equipment is moving, comprises:
providing a plurality of additional wireless communication links, that each provide a respective additional wide cell coverage area, having respective additional wide cell coverage areas geographically proximate to the narrow cell coverage area;
transmitting a respective beacon signal to the user equipment via each additional wireless communication link; and
determining that the user equipment is moving responsive to a power level of the beacon signals received at the user equipment.

6. The method as claimed in claim 5, further comprising:
responsive to received power levels of the beacon signals transmitted via the additional wireless communication links and received at the user equipment, estimating a direction of movement of the user equipment.

7. The method as claimed in claim 6, further comprising:
responsive to the estimated direction of movement, determining an expected location of the user equipment and relocating the wide cell coverage area proximate to the expected location.

8. The method as claimed in claim 7, further comprising:
in real time, repeatedly relocating the wide cell coverage area to an expected location of the user equipment.

9. The method as claimed in claim 1, wherein the step of determining that the user equipment is moving, comprises:
via the multi-channel wireless communication link, instructing the user equipment to transmit an uplink reference signal;
at each aerial vehicle, receiving the transmitted uplink reference signal; and
determining that a user equipment is moving responsive to the received reference signal, received at each aerial vehicle.

10. The method as claimed in claim 9, further comprising:
determining an expected location of the user equipment and responsive to the expected location, relocating the wide cell coverage area proximate to the expected location.

11. The method as claimed in claim 5, further comprising:
responsive to determining that a user equipment is moving, determining that the user equipment is moving in a direction whereby a loss of connection via the multi-channel wireless communication link is likely.

12. The method as claimed in claim 11, further comprising:
determining that a loss of connection is likely by determining at least one likely wireless propagation characteristic for the expected location and determining that a loss of connection is likely if the at least one propagation characteristic satisfies a predetermined condition, or determining that a loss of connection is likely by determining that the expected location is more than a predetermining distance from a centre point associated with the wide cell coverage area.

13. A communication network, comprising:
a plurality of directional antennas;
a plurality of aerial vehicles that each supports at least one of the plurality of directional antennas; and
a processing element configured to:
register a wide cell with a core network, the wide cell having a wide cell coverage area and provided via a single channel wireless communication link by one of the plurality of directional antennas;
register a narrow cell with the core network, the narrow cell having a narrow cell coverage area and provided via a multi-channel wireless communication link by multiple ones of the plurality of directional antennas;
determine that a user equipment is moving within the narrow cell, wherein movement of the user equipment may cause a loss of connectivity via the multi-channel wireless communication link to occur;
based on determining that the user equipment is moving, issue a request for a user plane path switch for the user equipment to transfer communication via the multi-channel wireless communication link to communication via the single channel wireless communication link by disabling communication with the user equipment via the multi-channel wireless communication link and enabling communication with the user equipment via the single channel wireless communication link;
subsequently, determine that movement of the user equipment is such that a narrow cell having a narrow coverage area is likely to be able to maintain a link with the user equipment; and
issue a further request for a further user plane path switch for the user equipment to transfer communication via the single channel wireless communication link to communication via the multi-channel wireless communication link or a further multi-channel wireless communication link that also provides a narrow cell having a narrow cell coverage area by disabling communication with the user equipment via the single channel wireless communication link and enabling communication with the user equipment via the multi-channel communication link or the further multi-channel wireless communication link to reestablish communication with the user equipment via a narrow cell having a narrow cell coverage area.

14. The network as claimed in claim 13, further comprising:
a ground based cell processing centre that comprises the processing element and includes at least one interface to the core network and optionally includes an aerial vehicle flight control unit and a beamforming control unit; and
at least one ground station, each comprising a directional antenna element, arranged to relay user data and control information between each aerial vehicle and the cell processing centre.

15. The network as claimed in claim 14, further comprising:
the processing centre comprises a user plane external interface (SI) connectable to a serving gateway (S-GW) of the core network and a further interface (SI-MME) for delivering signalling protocols to a mobility management entity (MME) of the core network.

16. The network as claimed in claim 14, further comprising:
the processing centre is configured to create and maintain a respective virtual or physical base station for each further cell.

17. The network as claimed in claim 16, further comprising:
the processing centre further comprises a fronthaul interface for connecting a virtual base station with one or more of the plurality of directional antennas on respective aerial vehicles.

18. The network as claimed in claim 13, further comprising:
the user equipment; and
each aerial vehicle comprises a high altitude platform (HAP) and each of the plurality of directional antennas is arranged as a remote radio head (RRH) for communicating wirelessly with the user equipment.

* * * * *